(12) United States Patent
Borduas

(10) Patent No.: US 11,900,537 B2
(45) Date of Patent: Feb. 13, 2024

(54) METHOD AND DEVICE FOR CONSTRAINING SHAPE DEFORMATION OF 3D OBJECTS

(71) Applicant: TECHNOLOGIES SHAPESHIFT 3D INC., Montreal (CA)

(72) Inventor: Jonathan Borduas, Montreal (CA)

(73) Assignee: Technologies Shapeshift 3D INC., Montreal (CA)

( * ) Notice: Subject to any disclaimer, the term of this patent is extended or adjusted under 35 U.S.C. 154(b) by 0 days.

(21) Appl. No.: 17/330,341

(22) Filed: May 25, 2021

(65) Prior Publication Data

US 2021/0366189 A1  Nov. 25, 2021

Related U.S. Application Data

(60) Provisional application No. 63/029,640, filed on May 25, 2020.

(51) Int. Cl.
 *G06T 17/10* (2006.01)
 *G06T 5/30* (2006.01)
 *G05B 19/4099* (2006.01)
 *G06T 7/20* (2017.01)

(52) U.S. Cl.
 CPC .............. *G06T 17/10* (2013.01); *G06T 5/30* (2013.01); *G06T 7/20* (2013.01); *G06T 2207/30241* (2013.01); *G06T 2210/12* (2013.01)

(58) Field of Classification Search
 CPC ........ G06T 17/10; G06T 5/30; G05B 19/4099
 See application file for complete search history.

(56) References Cited

U.S. PATENT DOCUMENTS

| | | | | |
|---|---|---|---|---|
| 5,649,084 A | * | 7/1997 | Ernst ..................... | G06T 17/10 |
| | | | | 345/630 |
| 8,643,654 B1 | * | 2/2014 | Green ..................... | G06T 13/00 |
| | | | | 345/473 |
| 8,768,656 B2 | | 7/2014 | Yucel et al. | |

(Continued)

FOREIGN PATENT DOCUMENTS

| | | |
|---|---|---|
| EP | 1158454 A2 | 11/2001 |
| EP | 1239680 A2 | 9/2002 |

(Continued)

OTHER PUBLICATIONS

Terzopoulos et al., "Constraints on Deformable Models: Recovering 3D Shape and Nonrigid Motion", Artificial Intelligence 36 (1988) 91-123. Retrieved from the Internet <https://www.researchgate.net/publication/222458718_Constraints_on_Deformable_Models_Recovering_3D_Shape_and_Nonrigid_Motion>.

(Continued)

*Primary Examiner* — Yi Yang
(74) *Attorney, Agent, or Firm* — Bereskin & Parr LLP; Louis-Pierre Gravelle

(57) ABSTRACT

A method and system for providing the ability to deform and adapt a 3D model and associated 3D object to comply with a set of extrinsic and intrinsic constraints to guarantee function and fit with respect to a 3D target object. The method includes simplifying the 3D object with a topological simplification, identifying a number of constraint zones according to defined characteristics such as external rigid and non-rigid zones and internal rigid and non-rigid zones, and modifying the 3D model with respect to the constraint zones.

29 Claims, 13 Drawing Sheets

(56) References Cited

U.S. PATENT DOCUMENTS

| | | |
|---|---|---|
| 8,874,251 B2 | 10/2014 | Thornton |
| 9,880,542 B1* | 1/2018 | Brown ................ G05B 19/4086 |
| 10,279,581 B2 | 5/2019 | Ashcroft et al. |
| 10,395,372 B2 | 8/2019 | Anand et al. |
| 10,481,587 B2 | 11/2019 | Huysmans et al. |
| 10,482,187 B2 | 11/2019 | Summit et al. |
| 10,565,801 B2 | 2/2020 | Chen et al. |
| 10,688,722 B2 | 6/2020 | Buller et al. |
| 10,758,283 B2 | 9/2020 | Frey et al. |
| 10,762,717 B2 | 9/2020 | Alkouh |
| 10,779,982 B2 | 9/2020 | Van Meer |
| 10,838,402 B2 | 11/2020 | Sims et al. |
| 2014/0336808 A1 | 11/2014 | Taylor et al. |
| 2015/0302114 A1* | 10/2015 | Patrick .................... G06T 19/20 703/1 |
| 2020/0051258 A1* | 2/2020 | Miao ..................... G06V 20/653 |
| 2020/0064812 A1* | 2/2020 | Sims ..................... B29C 64/393 |
| 2020/0320764 A1* | 10/2020 | Bryson .................. G06F 9/451 |
| 2020/0342684 A1 | 10/2020 | Kinsella |

FOREIGN PATENT DOCUMENTS

| | | |
|---|---|---|
| KR | 20160046106 | 4/2016 |
| WO | 2017208256 | 12/2017 |

OTHER PUBLICATIONS

Han et al., "Adaptive Constraint and 3D Sketch-Based Deformation for Interactive Free Form Surface Styling", Conference: GRAPP 2006: Proceedings of the 1st International Conference on Computer Graphics Theory and Applications. 392-399.

English Translation—Machine Generated of KR20160046106A, "Three-Dimensional Shape Modeling Apparatus for Using the 2D Cross-Sectional Accumulated and Method Thereof", published on Apr. 28, 2016.

* cited by examiner

METHOD AND DEVICE FOR CONSTRAINING SHAPE DEFORMATION OF 3D OBJECTS

FIELD

Various embodiments are described herein that generally relate to a device for constraining shape deformation of 3D objects, as well as the methods of use thereof.

BACKGROUND

The following paragraphs are provided by way of background to the present disclosure. They are not, however, an admission that anything discussed therein is prior art or part of the knowledge of persons skilled in the art.

The recent emergence of additive manufacturing, colloquially known as 3D printing, has opened up avenues for easily customizing a variety of objects in order to conform to a user's requirements. This can include shape and size, as well as the provision of particular elements that may not be part of the original object. In order to perform additive manufacturing techniques, objects are typically sliced into thin layers, and the resulting layers serve as a basis for the instructions to "print" the object with different materials.

Traditionally, a customization process for a given object would begin by generatively constructing geometries over the scan of an individual; this is referred as parametric modeling. The more complex the product, the more difficult it is to customize it as more features means more development, more testing, and more opportunities for algorithms to fail.

In 3D modeling, animation, effects, manufacturing, and rendering applications, it is desirable to customize one 3D object or part onto another target object. For example, a product of a knee brace company may be customized or adapted onto the 3D scan of the knee of the person for whom the knee brace is intended. In another example, an intricate padding may be wrapped around a spherical surface such as the 3D scan of a head. In such examples, the knee and the head both are referred as a 3D target object, and the knee brace and intricate padding are both referred as the 3D object. With such an application/effect, it may be desirable for the 3D object to conform to a surface of a 3D target object yet retain its detailed model proportions. In another example, it may be desirable for zones of the 3D object to conform to the surface of the 3D target object, while other zones of the 3D object may be rigidly roto-translated to be mechanically functional, while still other zones of the 3D object might be told to act as a smooth transition between other zones.

There is a need for a system and method for providing a deformed 3D object of a product or 3D object that meets predetermined constraints that addresses the challenges and/or shortcomings described above.

SUMMARY OF VARIOUS EMBODIMENTS

Various embodiments of a system and method for providing a modified model of a product or object that meets predetermined constraints, and computer products for use therewith, are provided according to the teachings herein.

According to one aspect of the invention, there is disclosed a method of deforming a 3D object onto a 3D target object in a constrained manner comprising: receiving the 3D object and the 3D target object; applying zone definition and constraint zone selection to the 3D object, thereby generating a 3D model having a plurality of zones; applying constraints on the 3D model through zone processing applied to the plurality of zones, thereby generating a deformed 3D object; and outputting the deformed 3D object for use to cause the deformed 3D object to be digitally fabricated.

In another aspect, there is disclosed a method of using a topological graph of a first 3D object to transfer one or more delimited areas to a second 3D object of similar topology comprising: receiving the first 3D object and the second 3D object; receiving one or more delimited areas for one or more branches of the first 3D object; analyzing the first 3D object to obtain a first topological graph and using the first topological graph to create a first parametrization, the first parametrization including a first set of scalar functions for the first 3D object that correspond to the one or more branches of the first 3D object; analyzing the second 3D object to obtain a second topological graph and using the second topological graph to create a second parametrization, the second parametrization including a second set of scalar functions for the second 3D object that correspond to the one or more branches of the second 3D object; generating one or more scalar values corresponding to the delimited areas on the first 3D object using the first set of scalar functions; constructing locations of the delimited areas on the second 3D object using the one or more scalar values and the second set of scalar functions; and outputting the delimited areas on the second 3D object for use to cause the delimited areas on the second 3D object to be digitally fabricated.

In another aspect, there is disclosed a method of using a topological graph of a first 3D object to transfer a first set of scalar fields to a second 3D object of similar topology comprising: receiving the first 3D object and the second 3D object; receiving the first set of scalar fields in the space neighboring the first 3D object for one or more branches of the first 3D object; analyzing the first 3D object to obtain a first topological graph and using the first topological graph to create a first parametrization including a first set of scalar functions for the first 3D object that correspond to the one or more branches of the first 3D object; analyzing the second 3D object to obtain a second topological graph and using the second topological graph to create a second parametrization including a second set of scalar functions for the second 3D object that correspond to the one or more branches of the second 3D object; constructing a second set of scalar fields appended to the second 3D object using the first parametrization, the second parametrization, and the first set of scalar fields; and outputting the second set of scalar fields for use to cause the second 3D object to be digitally fabricated.

In another aspect, there is disclosed a method of creating one or more delimited areas on a 3D object according to a topology of the 3D object comprising: receiving the 3D object, the 3D object having one or more branches; receiving one or more scalar values for one or more branches of the 3D object for use in creating the one or more delimited areas on the 3D object; analyzing the 3D object to obtain a topological graph, the topological graph having one or more segments corresponding to the one or more branches, and using the topological graph to create a parametrization, the parametrization including one or more scalar functions for the 3D object corresponding to the one or more branches; creating each of the one or more delimited areas for each of the one or more branches of the 3D object using the one or more scalar values and the one or more scalar functions; outputting the delimited areas of the 3D object for use to cause the 3D object to be digitally fabricated.

In another aspect, there is disclosed a method of simplifying a topology of a 3D object while preserving geometry comprising: receiving the 3D object and a target topological characteristic; performing a morphological dilation operation on the 3D object until the target topological characteristic is obtained, thereby generating a dilated surface; computing optimal trajectories, using a field computed from a property of the 3D object, to displace each point of the dilated surface in a direction of the 3D object; displacing the dilated surface according to the optimal trajectories until a stopping criterion is reached for each individual point of the dilated surface, thereby generating a modified 3D object with a simplified topology; and outputting the modified 3D object for use to cause the modified 3D object to be digitally fabricated.

In another aspect, there is disclosed a method of processing boundary curves of a first surface of a first 3D object onto a second surface of a second 3D object in a constrained manner comprising: receiving the first 3D object having the first surface, the first surface having one or more boundary curves; calculating an initial solution of the one or more boundary curves of the first surface onto the second surface; reducing distortion of the initial solution onto the second surface, using an energy calculation and optimization on displacements of points of the optimized solution in comparison with the boundary curves of the source surface, thereby creating an optimized solution; and outputting the boundary curves of the optimized solution for use to cause the boundary curves of the optimized solution to be digitally fabricated.

In another aspect, there is disclosed a method of deforming a 3D object in a constrained manner comprising: receiving the 3D object; applying part processing of the 3D object through a topological rig, thereby generating a plurality of branches into which the 3D object is separated; applying zone definition and constraint zone selection to the plurality of branches, thereby generating a 3D model having a plurality of zones; applying constraints on the 3D model through zone processing applied to the plurality of zones, thereby generating a deformed 3D object; and outputting the deformed 3D object for use to cause the deformed 3D object to be digitally fabricated.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Figure 1:
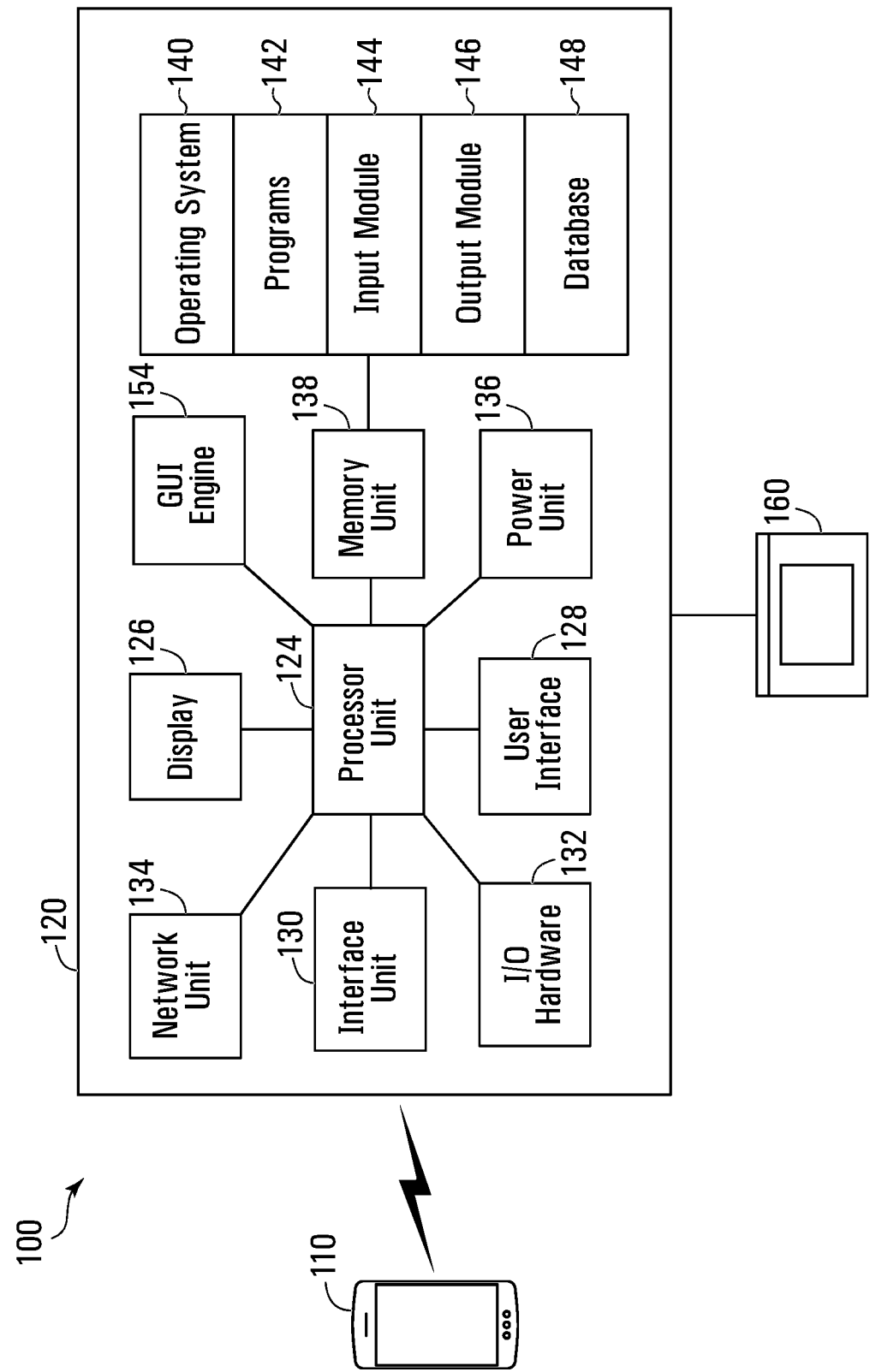
FIG. 1 shows a block diagram of an example embodiment of an automated system for constraining shape deformation of 3D objects.

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems, or methods having all of the features of any one of the devices, systems, or methods described below or to features common to multiple or all of the devices, systems, or methods described herein. It is possible that there may be a device, system, or method described herein that is not an embodiment of any claimed subject matter. Any subject matter that is described herein that is not claimed in this document may be the subject matter of another protective instrument, for example, a continuing patent application, and the applicants, inventors, or owners do not intend to abandon, disclaim, or dedicate to the public any such subject matter by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling can have a mechanical or electrical connotation. For example, as used herein, the terms coupled or coupling can indicate that two elements or devices can be directly connected to one another or connected to one another through one or more intermediate elements or devices via an electrical signal, electrical connection, or a mechanical element depending on the particular context.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5%, or 10%, for example, if this deviation does not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

It should also be noted that the use of the term "window" in conjunction with describing the operation of any system or method described herein is meant to be understood as describing a user interface for performing initialization, configuration, or other user operations.

The example embodiments of the devices, systems, or methods described in accordance with the teachings herein may be implemented as a combination of hardware and software. For example, the embodiments described herein may be implemented, at least in part, by using one or more computer programs, executing on one or more programmable devices comprising at least one processing element and at least one storage element (i.e., at least one volatile memory element and at least one non-volatile memory element). The hardware may comprise input devices including at least one of a touch screen, a keyboard, a mouse, buttons, keys, sliders, and the like, as well as one or more of a display, a printer, and the like depending on the implementation of the hardware.

It should also be noted that there may be some elements that are used to implement at least part of the embodiments described herein that may be implemented via software that is written in a high-level procedural language such as object-oriented programming. The program code may be written in C++, C #, JavaScript, Python, or any other suitable programming language and may comprise modules or classes, as is known to those skilled in object-oriented programming. Alternatively, or in addition thereto, some of these elements implemented via software may be written in assembly language, machine language, or firmware as needed. In either case, the language may be a compiled or interpreted language.

At least some of these software programs may be stored on a computer readable medium such as, but not limited to, a ROM, a magnetic disk, an optical disc, a USB key, and the like that is readable by a device having a processor, an operating system, and the associated hardware and software that is necessary to implement the functionality of at least one of the embodiments described herein. The software program code, when read by the device, configures the device to operate in a new, specific, and predefined manner (e.g., as a specific-purpose computer) in order to perform at least one of the methods described herein.

At least some of the programs associated with the devices, systems, and methods of the embodiments described herein may be capable of being distributed in a computer program product comprising a computer readable medium that bears computer usable instructions, such as program code, for one or more processing units. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, internet transmissions (e.g., downloads), media, digital and analog signals, and the like. The computer useable instructions may also be in various formats, including compiled and non-compiled code.

In accordance with the teachings herein, there are provided various embodiments for a method and device for constraining shape deformation of 3D objects, and computer products for use therewith.

A new modeling paradigm referred to as "Constrained Template Modeling" (CTM), where template refers to the 3D object, achieves the goal of personalizing an intricate product with intricate requirements (such as intrinsic compliance of thickness). The inputs of this modeling technique are the 3D object which is the product itself (e.g., a knee brace) and the 3D target object which is the 3D scan (e.g., of an individual). The 3D object of the product, or simply the 3D object, may be generated by any commercially available Computer-Aided Design (CAD) software capable of exporting standard CAD exchange files such as STEP and IGES. The output is a deformed 3D object that meets predetermined constraints.

The various embodiments of the systems and methods employing CTM that are described herein provide one or more of the following advantages over traditional parametric modeling: (1) allowing customization of the product while respecting the branding and styling of an intricate product; (2) allowing adaptation of an intricate product, thereby realizing a high performance product; (3) respecting the engineering tolerances necessary for the product certification; (4) easily integrating a wide variety of style/branding to the product; and (5) allowing the customization of non-uniform rational B-spline curves (NURBS) and mesh representations while guaranteeing the printability/manufacturability of the output product. A description of a preferred embodiment is detailed herein.

Given a three-dimensional model, at least one embodiment provides a method for creating a copy of a 3D object through a deformation (e.g., morphing, transformation) that respects a series of extrinsic and intrinsic constraints, to guarantee function, form, fit, manufacturability, aesthetics of a product, and/or compliance with engineering constraints. Various zones of the 3D object may be identified and processed as rigid elements, allowing only a limited number of transformations, and non-rigid elements, allowing for a greater number of transformations, according to constraints of the environment (extrinsic) or constraints internal to the intricate model (intrinsic), such as preservation of aesthetics and compliance with engineering constraints.

In one or more embodiments, the method is applied to fit a 3D object to another object (the 3D target object), such as, but not limited to, a body part.

Additional embodiments provide and enable a user interface allowing for the selection of the different zones in the 3D object according to any combination of the following constraint zones:

- extrinsic non-rigid (XNR), allowing for the matching of a subset surface of the 3D object with the 3D target object's surface;
- extrinsic rigid (XR), allowing for respecting external constraints for the function of the product (3D object);
- intrinsic rigid (IR), allowing for respecting internal structure of the 3D object; and
- intrinsic non-rigid (INR), allowing for the blending of the other constraint zones respecting engineering and aesthetics constraints.

The user interface also provides the capability to place various Boolean operations (before, during, and/or after the different phases) identifying elements, such as, but not limited to, bores, engravings, and lattice structures, to be fitted on the 3D object.

Reference is first made to FIG. 1, showing a block diagram of an example embodiment of an automated system 100 for constraining shape deformation of 3D objects. The system 100 includes at least one user device 110 and/or at least one server 120. The user device 110 and the server 120 may communicate, for example, wirelessly or over the Internet. The system 100 may include a digital fabrication unit 160 (such as a 3D printer, CNC milling machine, machining center, laser cutter, water jet cutter, or CNC turning machine, or the like).

The user device 110 may be a computing device that is operated by a user. The user device 110 may be, for example, a smartphone, a smartwatch, a tablet computer, a laptop, a virtual reality (VR) device, or an augmented reality (AR) device. The user device 110 may also be, for example, a combination of computing devices that operate together, such as a smartphone and a sensor. The user device 110 may also be, for example, a device that is otherwise operated by a user, such as a drone, a robot, or remote-controlled device; in such a case, the user device 110 may be operated, for example, by a user through a personal computing device (such as a smartphone). The user device 110 may be configured to run an application (e.g., a mobile app) that communicates with other parts of the system 100, such as the server 120.

The server 120 may run on a single computer, including a processor unit 124, a display 126, a user interface 128, an interface unit 130, input/output (I/O) hardware 132, a network unit 134, a power unit 136, and a memory unit (also referred to as "data store") 138. In other embodiments, the server 120 may have more or less components but generally function in a similar manner. For example, the server 120 may be implemented using more than one computing device.

The processor unit 124 may include a standard processor, such as the Intel Xeon processor, for example. Alternatively, there may be a plurality of processors that are used by the processor unit 124, and these processors may function in parallel and perform certain functions. The display 126 may be, but not limited to, a computer monitor or an LCD display such as that for a tablet device. The user interface 128 may be an Application Programming Interface (API) or a web-based application that is accessible via the network unit 134. The network unit 134 may be a standard network adapter such as an Ethernet or 802.11x adapter.

The processor unit 124 can also execute a graphical user interface (GUI) engine 154 that is used to generate various GUIs. The GUI engine 154 provides data according to a certain layout for each user interface and also receives data input or control inputs from a user. The GUI then uses the inputs from the user to change the data that is shown on the current user interface, or changes the operation of the server 120 which may include showing a different user interface.

The memory unit 138 may store the program instructions for an operating system 140, program code 142 for other applications, an input module 144, an output module 146, and a database 148. The database 150 may be, for example, a local database, an external database, a database on the cloud, multiple databases, or a combination thereof.

The programs 142 comprise program code that, when executed, configures the processor unit 124 to operate in a particular manner to implement various functions and tools for the system 100.

The term "poly-harmonic", as in poly-harmonic function, is used as a generalization of terms including, but not limited to, "harmonic", "biharmonic", and "tri-harmonic" boundary value problems. Such a poly-harmonic function may be considered as the solution to a poly-harmonic bounded value problem.

The term "radial basis function deformation" is used as a generalization of terms including, but not limited to, "thin plate spline transform".

Figure 2:
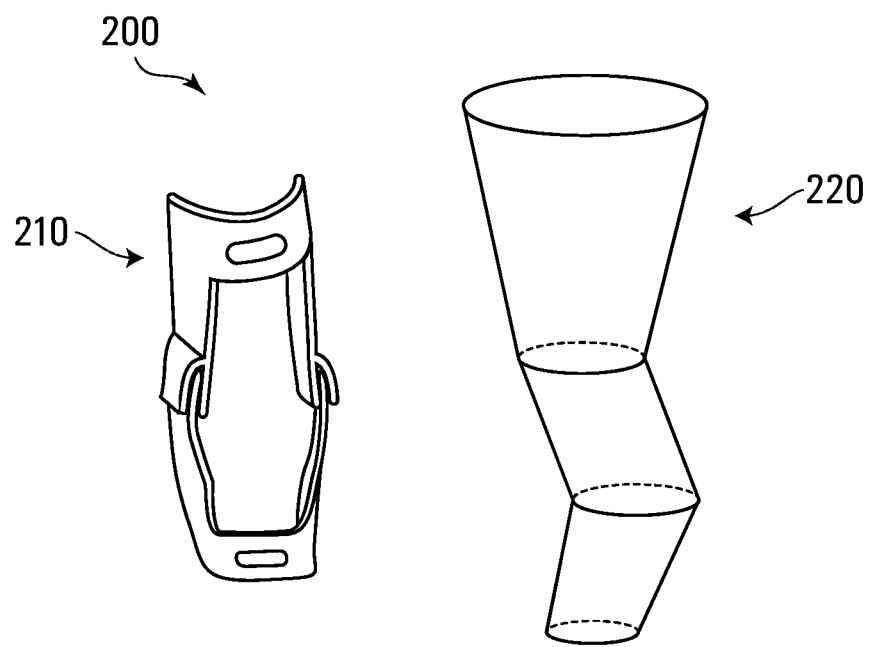
FIG. 2 shows an example embodiment of a 3D object and a 3D target object.

Referring to FIG. 2, shown therein is an example embodiment 200 of a 3D object 210 and a 3D target object 220. A method for constraining shape deformation of 3D objects (e.g., a method to fit the 3D object 210 to the 3D target object 220) comprises some or all of the following phases: (1) part processing, (2) zone identification, (3) zone processing, and (4) additional processing.

Phase 1: Part Processing

In the first phase, part processing, a first step of the method is to provide an input consisting of the 3D object 210 designed beforehand with computer-aided design (CAD) software (or, alternatively, obtained through a 3D scan of the object). In one or more embodiments, this 3D object 210 may be topologically simplified by the algorithms (to create the topologically simplified 3D object) before further processing is applied. A simplification process is detailed herein.

Figure 3:
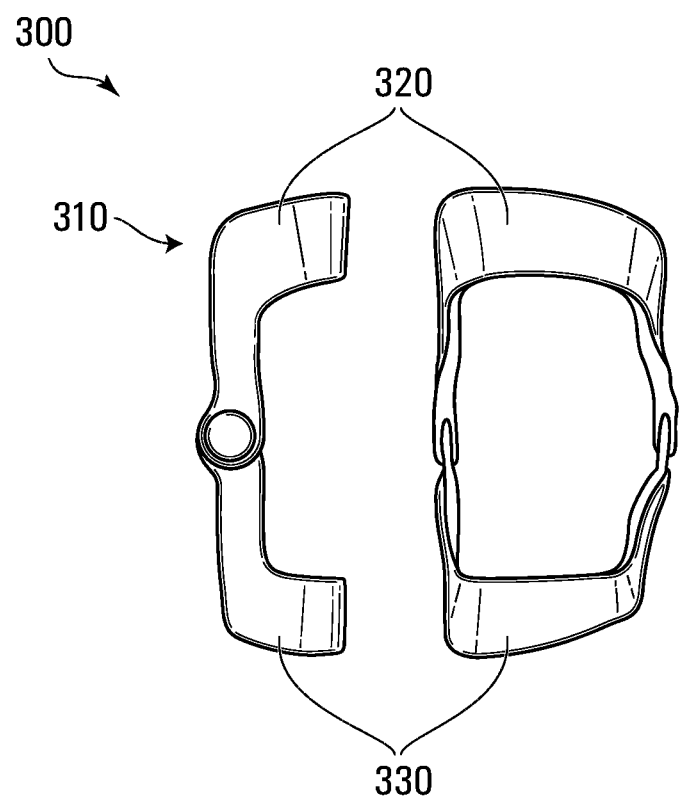
FIG. 3 shows an example embodiment of a 3D object divided into branches.

Definition of N parts: The method may be provided, by a user, an input consisting of the number of parts (N) that should define the 3D object 210. If N differs from the number of parts automatically detected and forming the 3D object 210, the parts are topologically simplified by a topological simplification algorithm described in detail in the following steps. Referring to FIG. 3, the 3D object 310 is divided into parts 320 and 330 when using N=2.

In one embodiment, if the number of parts N is identical to the number of parts found by the method on the 3D object 210 (or 3D object 310), the topological simplification may be bypassed.

Topological Simplification

For each of the N parts of the 3D object, the simplification process may be performed based on a number of topological branches defined by the user. The selection of the number of branches may follow a number of branches which can be independently manipulated.

This topological simplification process may be executed to automate the selection of the different constraint zones, allowing for an easy and automated integration of a variety of 3D objects by providing a correspondence between similar 3D objects (or products). This correspondence may be used such that once a first 3D object has been cut (using cuts) into different constraint zones (becoming the 3D model), a second 3D object may inherit its cuts (if topologically similar), and thus an equivalent positioning of the constraint zones. Additionally, two 3D objects (a first 3D object and a second 3D object), defined by a corresponding number of parts and number of branches may have interchangeable parametrization allowing for the mapping of delimited areas and scalar field between the two 3D objects.

Topological Simplification Algorithm

The topological simplification algorithm computes a dilated surface of a 3D object, generally preserving the initial geometry while having a simplified topology.

The algorithm performs a series of steps to achieve topological simplification. The inputs of the algorithm may be the 3D object 210 and a number of branches to be identified on the 3D object 210.

- The surface of the 3D object 210 is converted into an implicit representation of the surface, for instance using voxelization or creating a volume mesh.
- An iterative process is performed, comprising the following sub-steps:
  - A morphological operation known as "dilation" is performed on the implicit representation of the surface using a radius as an input parameter. The radius may first be set to 0 and increased on each iteration by an amount that may be defined in a search parameter.
  - The dilated implicit representation of the surface is converted back into a surface, the dilated surface. The dilated surface may be kept in physical memory as it may be used as the seed of streamlines employed by a vacuum wrap algorithm.
  - The two farthest away points (e.g., away in the sense of geodesic distance) on the dilated surface are evaluated.
  - A poly-harmonic boundary value problem is solved using the two farthest away pair of points, generating two scalar functions on the dilated surface.
  - One of the two scalar functions is selected (e.g., using specific criteria or even arbitrarily).
  - A Reeb graph of the selected scalar function is calculated, using for example the C++ Topology ToolKit (TTK) library, the Reeb graph having one or more segments.
- The iterative process is performed until a stop criterion is reached. The stop criterion may be defined by, without being limited to, a correspondence between the number of segments of the Reeb graph, calculated with the C++ TTK library, and a pre-determined number of segments which corresponds to the desired number of branches.

The output object of the algorithm is a dilated surface that has a desired topology and that may be further processed.

Vacuum Wrap Algorithm

In the case that the dilated surface does not correspond geometrically with the 3D object, a vacuum wrap algorithm may be executed to compute a topologically simplified 3D object (the output) having both a substantially similar geometry with the 3D object and the topology resulting from the topological simplification algorithm.

The vacuum wrap algorithm may be provided the dilated surface as an input and performs a series of steps as detailed herein:

- Any combination of one ore more middle points on the one or more segments of the Reeb graph and the equivalent one or more middle cuts on the branches of the topologically simplified 3D object are evaluated for each segment of the Reeb graph as identified with the topological simplification algorithm.
- The combination of middle points and middle cuts are projected back onto the surface of the 3D object.
- A poly-harmonic boundary value problem on the surface of the 3D object is solved using points forming the middle cuts and the farthest away pair of point as boundaries. The solution consisting of one or more scalar functions for the one or more branches may be saved to physical memory as the surface guiding scalars.
- The surface guiding scalars, positioned on the surface of the 3D object's surface mesh, are extrapolated into all the neighboring space(s) of the object.
- A spatial poly-harmonic extrapolation calculating extrapolated guiding scalars, also referred to as the matching field, is exemplified herein:
  - A space neighboring the 3D object is generated for instance by an oriented bounding box (OBB). The OBB may be evaluated from the original surface, and the OBB volume may be expanded by a margin.
  - A volume mesh, that may be composed of volumetric elements such as tetrahedral elements, hexahedral elements, and voxels, is calculated using the space neighboring the 3D object and the points of the 3D object's surface mesh. Other volumetric elements may optionally be considered in the calculation of the volume mesh.
  - For each point of the 3D object's mesh surface, a poly-harmonic boundary value problem in the volume mesh is solved.
  - The solutions of the poly-harmonic equations represent weights of a point of the 3D object over a specified region of the volume mesh. For each point of the volume mesh, a calculation involving the guiding scalar values and their respective weight is executed. This step is repeated for each of the one or more scalar functions on the 3D object's surface mesh.
  - A signed distance field is calculated using the volume mesh and the 3D object.
- The gradient of the signed distance field (Gdist) and the gradient of the matching field (Gmatch) can now be calculated. The guiding scalars field (Gguid) is defined according to the following equation:

$$Gguid = Gdist - ProjGmatch\ Gdist$$

This equation is interpreted as the projection of Gdist over Gmatch substracted to Gdist.

The dilated surface of the topological simplification algorithm is used as the seed of streamlines that are evolving in the guiding scalar field. Iteratively:

The streamlines are calculated iteratively using a stop criterion which may be defined by, but not limited to being defined by, any one of a value of "speed" of the streamline and a value indicating that the last point of the streamline has reached the surface of the 3D object.

When all streamlines have met a stop criterion, the dilated surface points coordinates are updated using the last position of the points of each streamline, resulting in an updated dilated surface.

All the regions of the updated dilated surface now in contact with the surface of the 3D object are left intact, and for all points and cells forming regions that have not reached the surface of the 3D object, with the cells consisting of triangles defined by three points or other suitable surfacic cell (e.g., any other polygon), the updated dilated surface is re-meshed, and thus updated again, to adjust the density of triangle in those regions.

All the points of the updated dilated surface not having reached the surface of the 3D object are used as seeds of new streamlines.

The process may be repeated until one specified exit criterion is reached. The exit criterion may consist of, but is not limited to, any one of an indication that all points of the updated dilated surface are positioned on the surface of the object, an iteration limit, and an indication that new iterations do not provide a useful result. The output of the algorithm is a final updated dilated surface, the topologically simplified 3D object.

Phase 2: Zone Determination

Topology Rig Algorithm

One branch can be separated in multiple zones that can have independent constraints and motions, referred to as constraint zones. The topology rig algorithm may be provided the topologically simplified 3D object, or may use the 3D object directly if it had the required topological features, as an input and performs a series of steps detailed herein:

For each of the N parts of the 3D object, the 2 farthest away points e.g., representing the two farthest points geodesically on the part) are evaluated.

The farthest away pair of points of the topologically simplified 3D objectare used as boundaries in the resolution of a poly-harmonic boundary value problem. The solutions to the poly-harmonic boundary value problem(s) are two scalar functions on the vacuum wrap surface.

One of the scalar functions is selected, and its Reeb graph is calculated, using for example the C++ TTK library.

Middle points on the Reeb graph and middle cuts computed from the middle points are evaluated for each segment identified on the Reeb graph.

A boundary value problem (e.g., poly-harmonic boundary value problem) on the topologically simplified 3D object is solved using the middle cuts and/or farthest away pair of points as boundaries in the resolution of the boundary value problem. The solution, in the form of one or more scalar functions for one or more branches, is saved to physical memory as one or more scalar functions, also referred to as the parametrization.

For each scalar function, a number of equivalued slices (the slice may also be equidistant in terms of value on the scalar field) are calculated. A centerline is defined for each segment using one of various techniques, comprising for instance using the center of mass of the equivalued slices and using the largest inscribed circle or sphere.

The centerline of each segment of the Reeb graph can be calculated.

In one or more embodiments, it is possible to add cuts to the centerline manually and onto equivalent cuts on the 3D object or topologically simplified 3D object.

In one or more embodiments, it is possible to add cuts to the centerline using an algorithm and onto equivalent locations on the 3D object or topologically simplified 3D object, the cuts allowing the selection of constraints zone onto the 3D object, thereby creating the 3D model.

The output object of the topology rig algorithm may be saved to physical memory and may be used in the calculation of the intrinsic non-rigid zones.

Figure 4:
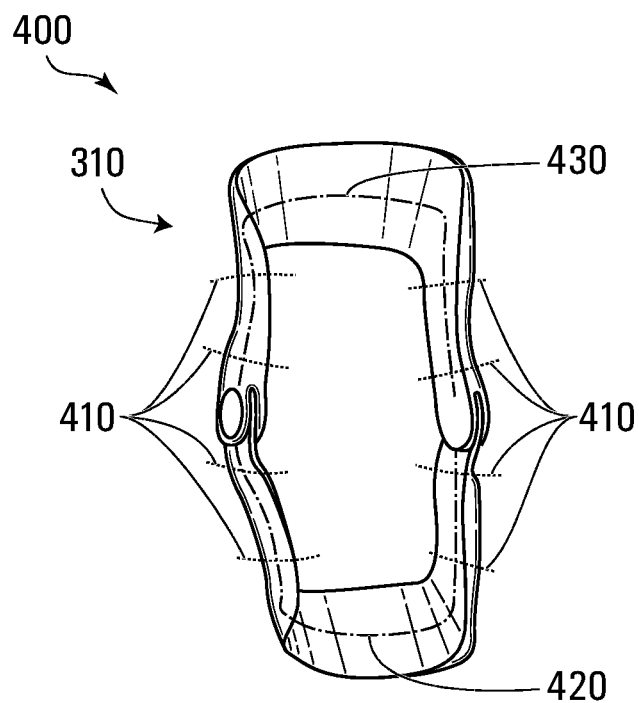
FIG. 4 shows an example embodiment of the 3D object of FIG. 3 with centerlines and cuts.

Referring to FIG. 4, shown therein is an example embodiment 400 of the topologically simplified 3D object 310 of FIG. 3. The topological simplification may, for example, be the output of toposimp and/or vacuum wrap processing. The 3D object having centerlines 420 and 430 of respective parts 320 and 330 is cut into multiple zones (and/or constraints zone) using cuts 410.

Figure 5:
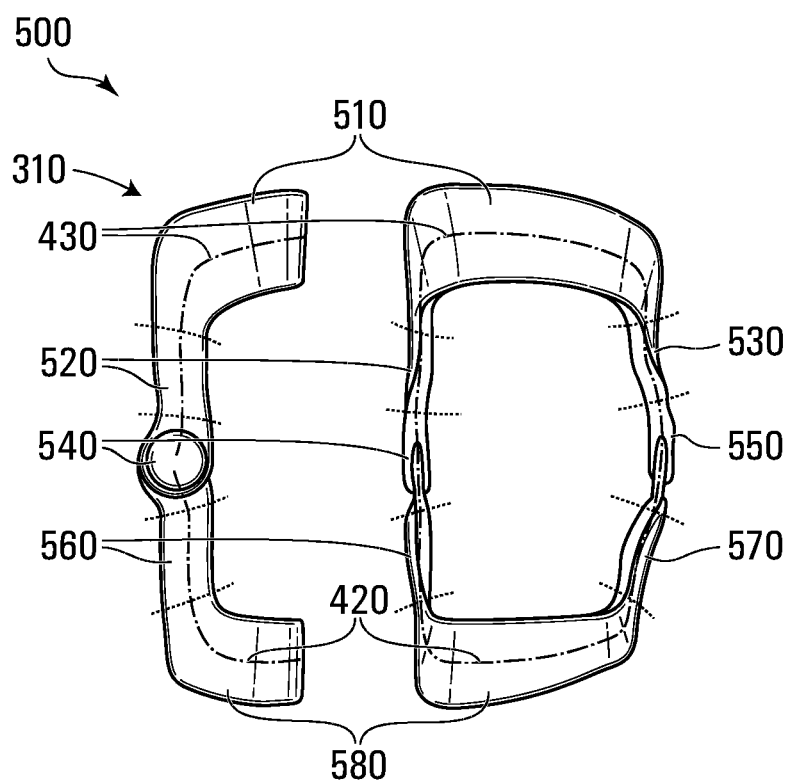
FIG. 5 shows an example embodiment of the 3D object of FIG. 3 separated into different intrinsic and extrinsic zones, thereby a 3D model.

Referring to FIG. 5, shown therein is an example embodiment 500 of the topologically simplified 3D object 310 of FIG. 3. The topologically simplified 3D object 310 has two distinct centerlines 420 and 430. The 3D object 310 is divided using cuts into eight separate zones (or constraint zones) 510, 520, 530, 540, 550, 560, 570, and 580.

Zone Selection

Constraint zones can now be added to form the 3D model (the 3D model being the 3D object separated into constraint zones), using the farthest away pair of points and user-defined (or algorithmically defined) cuts as delimitation of the zones. In at least one implementation, the zones are selected from a list consisting of an extrinsic rigid zone (XRZ), an extrinsic non-rigid zone (XNRZ), an intrinsic rigid zone (IRZ), and an intrinsic non-rigid zone (INRZ). Each zone includes a specific set of parameters, constraints, and modes of interaction. A number of zone selection methods may be available, allowing for a quick way to identify the zones and facilitating correspondence and interchangeability between 3D objects. A non-exhaustive list of the selection methods is detailed herein.

In other embodiments, the constraint zones may be added directly from the 3D object instead of from a topologically simplified 3D object if the 3D object already has a desired topology.

Per-Element Method

This selection mode is a direct element selection. The elements are defined by several types of structures including, but not limited to, points, wires (edges), patches (surfaces), and other structures well known to a person skilled in the art of 3D literature. The elements can be selected according to different methods, which include, without being limited to, selecting a list of identifications (IDs), manually picking and choosing in the 3D view, finding the N elements of a certain type according to coordinates, finding the N elements larger than a number of points, and selecting a certain surface area or a certain volume. It may also be possible for a user to select surfaces meeting certain defined criteria including, but not limited to, surfaces whose dot product of the normal and a vector is smaller than a defined value. In one or more embodiments, it may also be possible to select surfaces using raytracing and frustrum techniques.

Parameterization Method (Subset of an Element or a Set of Elements)

This selection mode allows section selection according to coordinate ranges. On filiform or surface elements, the selection can be made according to a range of conformal coordinates.

Element Method+Diffusion+Threshold+Selection

After a number of elements are selected according to other selection methods, the elements can be used as seeds of a diffusion process on the surface of the 3D object. The diffusion process may consist of, but is not limited to, any of a geodesic distance calculation and a Poisson equation resolution. It is then possible to generate streamlines which connect, for N elements, one element to the N−1 other elements. The streamlines may be filtered by any characteristics including, but not limited to, total length and maximum deviation. Using a defined threshold, the cells and points being traversed or touched by conforming streamlines may be added to the selection.

Indication Glyph

The method may provide a tool for adding information to the 3D object in the form of indication glyphs. The indication glyphs, which may be, but are not limited to, 3D shapes, can be recognized by the method and further processed, contributing to the linking process between the 3D object and a rig file.

Topological Rig Algorithm

The topological rig algorithm allows for elements and coordinate selection based on a topological analysis.

Under-Constrained Zone Selection

Under-constrained surfaces, that may be defined as surface points of the 3D object being correlated with less than a particular number of other points, are automatically added to the neighboring extrinsic zones and automatically selected following the selection of neighboring zones.

Phase 3: Zone Processing

In one or more embodiments, the zones may be manually defined by a user. In other embodiments, the zone definitions may be automated using the algorithms and methods defined in Phase 2.

Extrinsic Rigid Zones (XR Zones)

The extrinsic rigid zones may be positioned in space according to a rig file of the 3D target object (or target 3D scan), where the rig file is a markup language-defined file forming a coordinate system in the form of joints and elements. Alternatively, the extrinsic rigid zones may be positioned using a manual transformation (e.g., by a user). The rig file may also be constructed with parametrized joints and parent-child dependencies between the joints and the elements, allowing for parameter-controlled positioning of the extrinsic rigid zones. The rig file can also be used for controlling the location of constraints of the extrinsic non-rigid zones.

The rig file may undergo a step called "scaling" to better fit the geometry of the target object. The scaling is constrained by the presence of points, referred to as markers (or landmarks). The location of the markers can be guided by a user, the topological rig, post-processing on the topological rig, an AI, or a geometrical analysis of the 3D object and its centerline. For example, the rig for the knee of a child can be scaled to be anatomically suited to the knee of an adult. The scaling may also do the translation and finding of the parameters of the rig to fit the target object. The scaling may be implemented, for example, using the Scale tool provided in the OpenSIM library.

Figure 6:
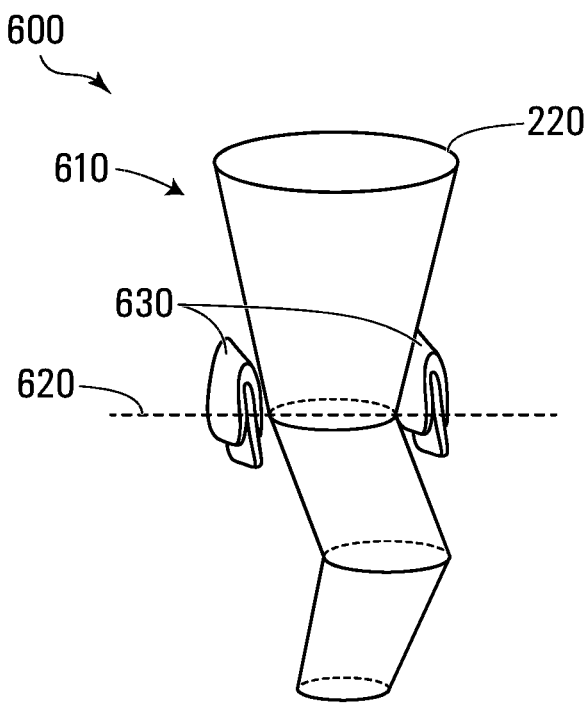
FIG. 6 shows an example embodiment of extrinsic rigid elements of a 3D model positioned in relation to a 3D target object.

Referring to FIG. 6, shown therein is an example embodiment 600 of a target model on which extrinsic rigid elements are positioned. A device 610 comprises the 3D target object 220 on which extrinsic rigid elements 630 are positioned. These extrinsic rigid elements 630 are aligned with an axis 620 of the 3D target object 220.

Positive Model Rectification

A positive model of the 3D target object 220 may undergo a series of modifications called a rectification. For example, it may be desirable to ensure that there is no pressure over a bone on a human body. Positive model rectification involves modifying the surface to ensure there is no pressure applied to a particular location prior to customization.

The positive model of a residual limb may be rectified to improve pressure distribution. Judicious addition or subtraction of material relieves the bony prominences and tender areas while increasing pressure to more tolerant areas, such as soft tissue and broad expanses of bone or tendon.

For example, in the transtibial (below-knee) prosthesis, pressure is increased by removing material at the following areas: patella tendon, pretibial muscles, flare of the tibia, popliteal area, and the calf musculature. Conversely, pressure is relieved by adding material in the following areas: tibial crest, distal portion of the tibia, fibula head, hamstring tendons, and patella.

Extrinsic Non-Rigid Zones (XNR Zones)

The extrinsic non-rigid zone may be used to guarantee the fit between a surface of the 3D object and the surface of the 3D target object by defining constraints between the surfaces. It may also carry 3D information conformal of the 3D object onto the 3D target object. The surface-to-surface constraint algorithm to be executed to construct an XNR zone is detailed herein.

Surface-to-Surface Constraints Algorithm

The user may use one of any of the element selection methods described hereinabove to define a subset of surface on the first 3D object, thereby the first surface (e.g., surface on the 3D object) which will be processed as an XNR zone. The following process may be executed on one boundary curve and may be repeated one or more times for a first surface having one or more boundary curves.

The surface-to-surface constraints algorithm comprises the following steps:

Constraint points are positioned manually or parametrically on the boundary curves.

A subset of the second 3D object, the second surface (e.g., surface of the 3D target object) on which the first surface will be projected is identified (e.g., by the user), and the corresponding constraint points may be positioned automatically or manually on the second surface.

An initial solution (the initial projection of the boundary curves onto the second surface) to a surface-to-surface positioning can be generated, for example, by one of the following ways:

i. If no constraint point is defined, the positioning of the first surface on the second surface may be guided by the mouse of the user. The algorithm may identify the location of the mouse as the center of mass of the initial solution. The user may repeat multiple times the selection the center of mass of multiple boundary curves. The algorithm may generate a circle projected onto the second surface around the said location or create a contour onto the second surface being equidistant (e.g., Euler distance, geodesic distance) from the center of mass. Alternatively, or in addition, the user may control the rotation of the initial solution using a parametric input.
  ii. If constraint points are defined on the second surface, the algorithm draws geodesic lines linking the constraint points to form the initial solution.
  iii. The algorithm may also use the UV parametrization of the first surface and second surface.
An input curve may also be used as an initial solution. This input can use any method such as closest-point projection, iterative closest point projection, cylindrical projection, and spherical projection.
The boundary curves are discretized into N points.
The initial solution is discretized to correspond with the boundary curves of the first surface subset discretization.
Iteratively:
  An energy calculation is computed. This calculation quantifies the energy of the error in bending and stretching of the initial or optimized solution on the second surface in comparison with the first surface. Additional constraints may be added to the calculation as energy terms.
  Using an iterative optimization process, based on a numerical optimization method such as Newton's method, a direction and a length (thus a vector) in which the algorithm should move each point of the initial or optimized solution and which minimize the energy of the solutions in comparison to the first surface boundary curves are calculated.
  Propagation of the direction and length may be calculated by multiple methods, with one method being, but not being limited to, using a heat method of propagation for each updated vector on the surface and using streamlines to find the correct location for an updated point. Alternatively, or in addition, a method of propagation includes using an approximative geodesic displacement consisting of vectors in the Euclidian space that are rotated (or projected) as to be embedded onto the surface. A large displacement can be discretized into smaller Euclidian vectors that are rotated (or projected) one by one onto the surface, to better approximate the surface.
The curve is updated until an exit criterion is reached. This criterion may include, but is not limited to, reaching a certain energy value, reaching a number of iterations, and reaching an energy variation value between iterations.
The optimized solution of the boundary curves of the first surface is now correctly positioned on the second surface of the second 3D object. Surface information of the first surface of the 3D object may now be positioned on the second surface. A closest point algorithm may be executed to move all points of the first surface as to be parametrized on the boundary curves, constituting an initial solution for the first surface on the second surface. A morphing algorithm such as a radial basis function deformation, or more specifically a thin plate spline Transform, or any other algorithm accepting a set of target and source landmarks to guide the transformation may be used instead of the closest point algorithm.
The angles and areas of each triangle of the first surface of the 3D object are quantified as energy, and an energy calculation is executed iteratively to find a more optimal solution for the location of the points of the projected first surface being optimized onto the second surface while keeping the points of boundary curves intact (with optimized solution of the boundary curves left untouched). In at least one implementation, energies such as as-rigid-as possible (ARAP) energy and as-mobius-as-possible (AMAP) energy may be included.
An extrusion based on the local normal of the first surface subset is computed. Alternatively, or in addition, the extrusion may be based on a given vector of the surface, or based on a combination of the local normal and a given vector of the surface. This extrusion is known as a "cage" and allows the encoding of the in-thickness information of the part within the extrinsic non-rigid Zone. This encoding is done using any one or any combination of three methods consisting of using a radial basis function deformation for all points, using poly-harmonic coordinates for all points within the volume of the extrusion, and using a mean value coordinate (MVC) for all points outside of the volume of the extrusion. In some embodiments, MVC may be used for encoding all points within the volume of the extrusion. Other morphing techniques and coordinates transforms, such as quadray coordinates and generalized barycentric coordinates, may also be substituted to the methods named hereinabove. ARAP transform may also be used where no cage is needed, and the model is only deformed based on the first and second surfaces. Another way to encode the 3D information onto the first surface is by creating a field emanating from the first surface (i.e., distance field in the volume) as follows:
  All points of the 3D object follow the gradient of the field in the direction of the first surface (i.e., streamline). The length of the streamline and the UV coordinate of the triangle where the streamline met the first surface are stored in an array for all points: (length of the streamline, U, V, ID of the triangle). After the first surface is projected unto the second surface, the inverse process may be executed. A distance field can be calculated for each point. A streamline emanating from the UV coordinate of the triangle ID stored into the array follows the gradient outward of the surface until a length L has been met. A factor can be applied on the length locally to control the thickness locally.
The first surface extrusion and second surface extrusion now have corresponding thicknesses, and the model incorporating the XNR deformations is compliant. A user may optionally create a set of extrusion layers (e.g., cage layers) that are either constant or dependent on a local value.
The first surface onto the second surface may as well undergo an offset (e.g., locally variable offset, equal offset) to follow the second surface but have a control of interference or gap with it.
The first surface subset contained in the extrinsic non-rigid zones may now be positioned relative to the second surface, respecting the layers constraints.

Figure 7:
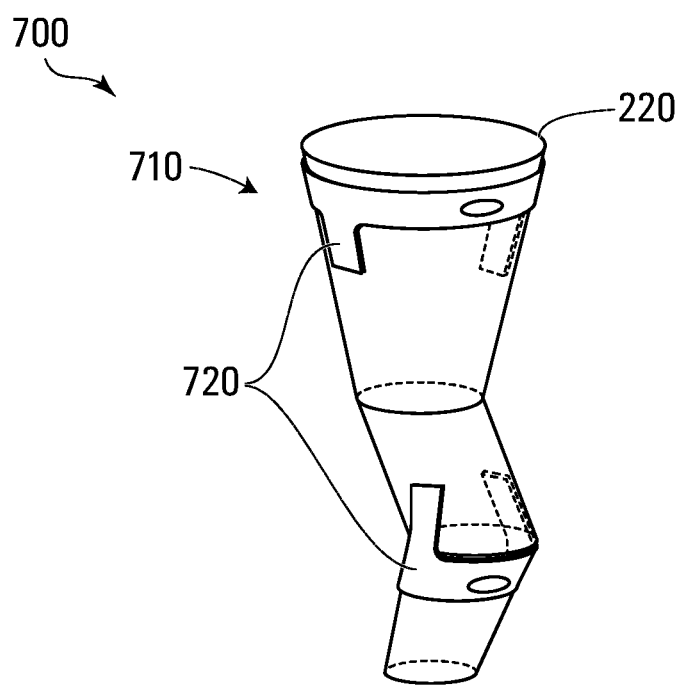
FIG. 7 shows an example embodiment of extrinsic non-rigid elements of a 3D model fitted onto a 3D target object.

Referring to FIG. 7, shown therein is an example embodiment 700 of a 3D model (or "first 3D object") where extrinsic non-rigid elements are fitted onto a 3D target object (or "second 3D object"). A device 710 comprises the 3D target object 220, on which the extrinsic non-rigid elements 720 (corresponding to cut zone 510 and 580 in FIG. 5) have been fitted.

Intrinsic Non-Rigid Zones (INR Zones)

The intrinsic non-rigid zone creates a smooth transition between the extrinsic rigid and non-rigid zones while trying to keep the engineering constraints, such as the thickness of the 3D object, guarantying the continuity of surface and forbidding any self-interference. The method involves a weight calculation of the intrinsic non-rigid zones, as described herein:

Using all controls points from the XR and XNR zones, the spatial poly-harmonic weights of each point of the volume are calculated, allowing a deformation that is by nature without any self-interference and that respects the continuity of surfaces. In some embodiments, other algorithms may be substituted to the spatial poly-harmonic weights calculation, including but not limited to the radial basis function (RBF) deformation and the generalized barycentric coordinates. The steps are as follows:

i. A space neighboring the 3D object, generated for instance by an oriented bounding box (OBB), the OBB evaluated from the 3D object surface and the OBB size expanded by a margin. In at least one implementation, a dilated surface of the topology simplification algorithm may be used, which can reduce the volume, accelerate the calculation of the weights, and forbid local interference.

ii. Using all control points from the XR and XNR zones as constraints and the space neighboring the 3D object, a volumetric mesh, composed of volumetric elements, such as tetrahedral elements, hexahedral elements, and voxels, is computed. A meshing algorithm favoring a high number of small tetrahedral elements near the surface of the 3D object surface and a smaller number of bigger elements away from the surface may be used.

iii. For each control point of the XR and XNR zones, a poly-harmonic equation in the volume mesh is calculated and the solution is interpolated to the 3D object, providing the spatial poly-harmonic Weight.

iv. If one or more points in the intrinsic zones is under-constrained, it is added to the closest XNR or XR zone and the poly-harmonic weights are calculated again.

In order to preserve the thickness of the 3D object surface, a spatial poly-harmonic extrapolation of the normal vectors of the XNR control surface is calculated and saved to physical memory. An interpolation of the output values of the extrapolation may be calculated on the vacuum wrap surface, the result being, for example, the in-thickness field;

The volume of the topologically simplified 3D object may be meshed with volumetric elements, such as tetrahedral elements, hexahedral elements, and voxels, in an acceptable initial manner such that information of the in-thickness field is added to a volumetric mesh of the vacuum wrap. More generally, the 3D object may be used directly—in general, the vacuum wrap is an optimization over using the 3D object directly. In at least one implementation, the volume of the vacuum wrap surface is meshed as soon as the vacuum wrap has been created. A count of the volumetric elements may be a useful parameter, as too many elements can hinder performance while giving only slight advantages in precision. The meshing is done in an acceptable manner according to any of a multitude of quality indicators which may include, without being limited to, edge ratio, aspect beta, aspect gamma, aspect, Frobenius, aspect ratio collapse ratio, condition, distortion, Jacobian, minimum dihedral angle, radius ratio, relative size squared, scale Jacobian, shape, shape and size, and volume, wherein each volumetric element stores a direction of the thickness that needs to be preserved, as given by the in-thickness field. The result is the vacuum wrap volumetric mesh.

The vacuum wrap volumetric mesh can be used to compute another set of poly-harmonic weights (e.g., generalized barycentric coordinates weight, local barycentric coordinates weight) that can be identified as solid poly-harmonic weights. These weights link the topologically simplified 3D object with the 3D object so that when the optimal transformation of the topologically simplified 3D object (to respect all criteria) is identified, the transformation can be applied back to the 3D object. This may be done just once after the topologically simplified 3D object is created and has been meshed volumetrically.

One of two methods consisting of a poly-harmonic surface transform and a deformation using the spatial poly-harmonic weights (poly-harmonic weights may be a scalar function computed using a poly-harmonic boundary valued problem) may be used to create a continuous surface over the output surface of the vacuum wrap algorithm, providing a surface respecting the imposed delimitation of the zones of the topological rig algorithm (and zone selection) while having a continuous surface. For example, displacement vectors on each point of the XR and XNR zones (i.e., between the 3D object and the deformed 3D object) can be calculated. The calculated weight can be used to calculate the displacement vector of all points in the INR zone. Transformation may then be applied.

A divergence-free shape interpolation algorithm having the topologically simplified 3D object (or, more generally, the 3D object) and the surface computed in the preceding step as inputs provides a divergence free transform. The vectors of the in-thickness field are correctly rotated and can be extrapolated to the rest of the points within the volume of the vacuum wrap to ensure that further optimization, such as optimization based on finite element analysis (FEA), can be carried out. One of two implementations of the divergence-free transformation may be executed:

i. The divergence-free transformation is not constrained into respecting the branches of the topologically simplified 3D object encompassing the XR and XNR (i.e., output of the divergence-free shape interpolation is taken as-is), increasing the chance of preserving the original thickness of the 3D object and continuity of the surfaces.

ii. The divergence-free transformation is constrained into respecting the branches of the topologically simplified surface encompassing the XR and XNR, compromising the continuity of surface, conformality, and capability to preserve thickness of the 3D object after the transformation. In other words, after having done the divergence-free shape interpolation, the associated segment of the vacuum wrap encompassing the XR and XNR is forced back into its place.

An optimization of the position of the points of the vacuum wrap volumetric mesh is performed. Iteratively:

i. Using finite element analysis, an energy function may be calculated depending on, but not limited to:

a) The continuity error on the surface;
b) The thickness that the solid tetrahedral element should have in the direction of the in-thickness field;
c) The volume error, defined as the difference between the initial or optimized volume and the 3D object volume, and conformality error of the solid tetrahedral elements;
d) The surfacic ARAP (or smooth rotation enhanced ARAP)—e.g., performed only on the topologically simplified 3D object;
e) The volumetric ARAP (or smooth rotation enhanced ARAP).

ii. A weight is applied on each factor of the energy function, and a numerical optimization is performed to iteratively find the optimal positions of each point of the vacuum wrap volumetric mesh.

Using the solid poly-harmonic weight on the content of the vacuum wrap surface, the segment encompassing the INR zone is positioned within the volume of the vacuum wrap surface.

Figure 8:
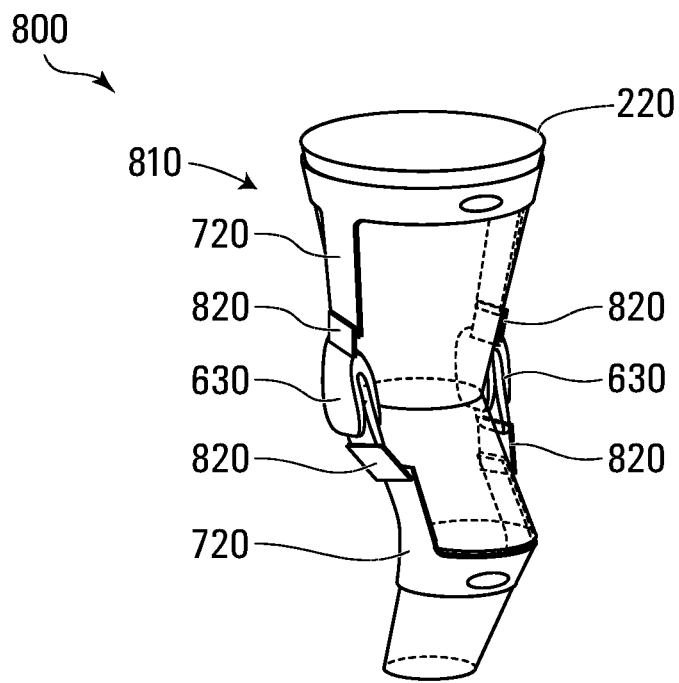
FIG. 8 shows an example embodiment of intrinsic non-rigid elements of a 3D model that are positioned according to the extrinsic rigid and non-rigid elements of FIGS. 6 and 7.

Referring to FIG. 8, shown therein is an example embodiment 800 of a target model having intrinsic non-rigid elements positioned according to the extrinsic rigid and non-rigid elements of FIGS. 6 and 7. A device 810 comprises the 3D target object 220 on which the extrinsic rigid elements 630 are placed, the extrinsic non-rigid elements 720 are fitted and placed, and the intrinsic non-rigid elements 820 are transformed and fitted to link the extrinsic rigid elements 630 and extrinsic non-rigid elements 720 together.

Intrinsic Rigid Zones (IR Zones)

The INR, XNR, and XR zones being positioned, the IR rigid zones may be forced back into their rigid positioning using a rigid transform orientation that averages best the INR deformation. The evaluation of such orientation can be done using various algorithms including, but not being limited to, a least square fit, an average of all transforms, and an iterative closest point (ICP). The surrounding is re-deformed a final time according to an INR deformation, now considering IR zones as extrinsic rigid zone constraints. In at least one implementation, a first INR is done with XR and XNR as inputs, while a second INR is done with XR, IR, and XNR as inputs.

Figure 9:
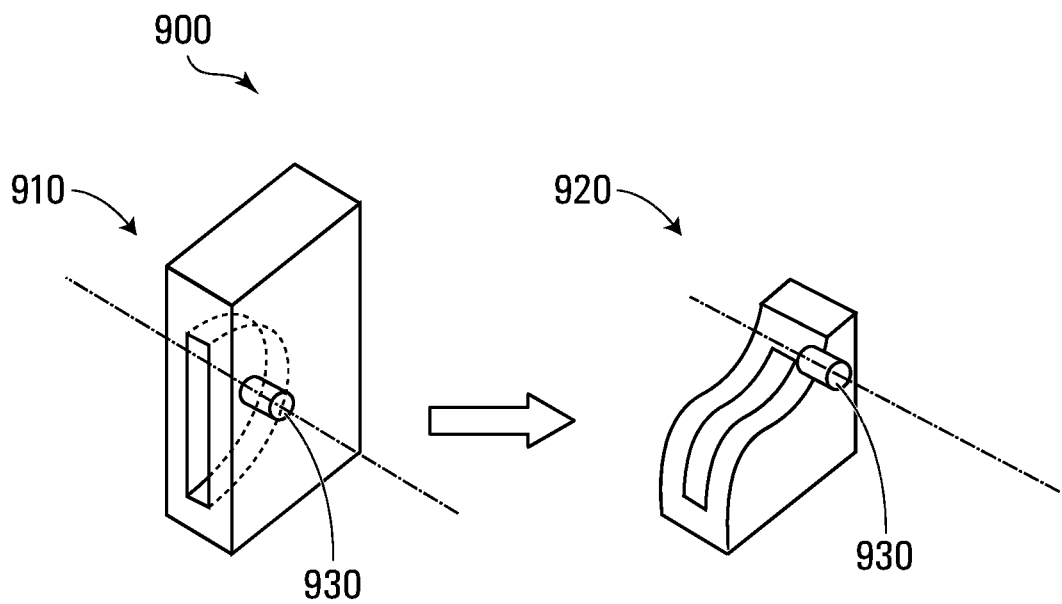
FIG. 9 shows an example embodiment of an intrinsic non-rigid element with an embedded intrinsic rigid element undergoing a deformation.

Referring to FIG. 9, shown therein is an example embodiment 900 of an intrinsic non-rigid element with an embedded intrinsic rigid element undergoing a deformation. A device 910 comprises an intrinsic non-rigid element in which a sub-element is identified as an intrinsic rigid zone 930. Once the device 910 is deformed into device 920 according to the XR and XNR zone constraints, the intrinsic rigid element 930 is re-deformed to assume its shape as it is in device 910.

Phase 4: Additional Processing

In one or more embodiments of the invention, once the 3D object has been transformed according to the preceding phases, it is possible to further process the output object generated by transforming the 3D object. This processing may include Boolean operations, NURBS deformation, and lattice generation.

Boolean Operation

In one or more embodiments of the invention, IR zones can be replaced or complemented by accurately roto-translated Boolean operations (either mesh-based or NURBS-based) between a geometry and the part itself. This allows the addition of a geometry of various elements, including, but not limited to, fixtures, screw holes, straps, and inserts.

In one or more embodiments of the invention, Boolean operations, and more generally CAD operations, can be used to change the 3D objects of the part before the morphing processed in phase 3 so that it can be parametrically changed.

In one or more embodiments of the invention, Boolean operations can be used after or before the deformation to add various elements, including but not limited to, alpha-numerical characters, bar codes, QR codes, and any pictogram identifying the part.

NURBS Deform

In one or more embodiments of the invention, a correspondence between an ensemble of NURBS and a mesh representation of the NURBS defined surfaced can be created.

If the mesh representation is deformed according to the embodiment detailed hereinabove, the ensemble of NURBS may be deformed correspondingly so that it accurately represents the deformed mesh representation, creating a deformed NURBS ensemble.

Lattice Generation

In one or more embodiments of the invention, closed volumes (either defined through a closed mesh surface, or a closed NURBS ensemble of surfaces) may be created and deformed to indicate where an algorithm can generate a lattice structure according to parameters including, but not limited to, density, orientation, and the lattice geometry itself.

Figure 10:
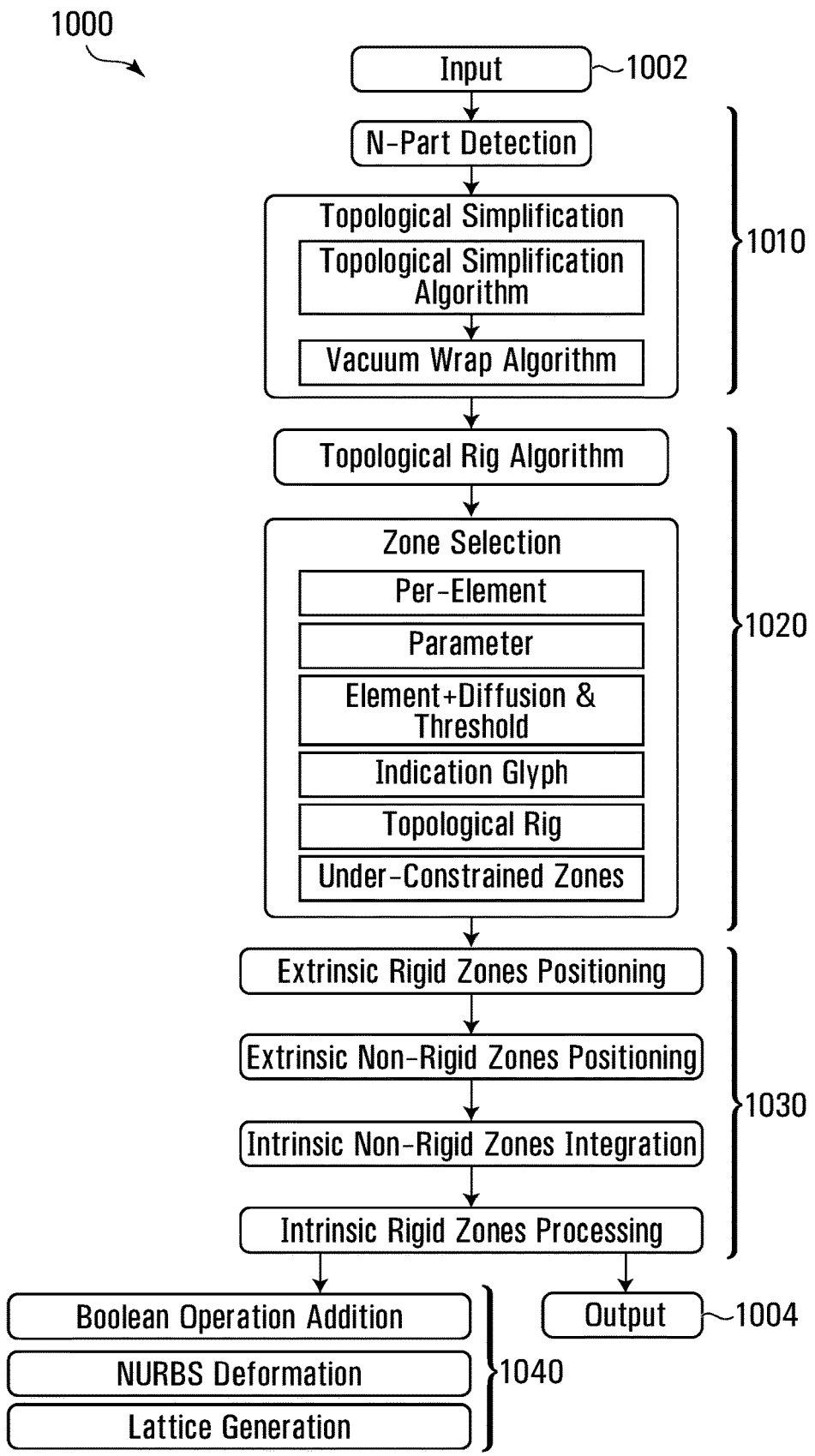
FIG. 10 shows a flowchart of an example embodiment of a method of fitting a 3D object to a 3D target object.

Referring to FIG. 10, shown therein is a flowchart of an example embodiment of a method 1000 of fitting a 3D object to a 3D target object. In method 1000, the system 100 applies one or more of the algorithms described herein to fit a 3D object to a 3D target object. The method 1000 shows various steps where an input 1002, such as the 3D object, is processed through: phase 1 1010, where it is topologically simplified; phase 2 1020, where the 3D object is split into zones; and phase 3 1030, where the zones are attributed to different zone types and the 3D object is deformed according to the different zone types. An output 1004 of the method is a deformed 3D object to fit the 3D target object.

In phase 1 1010, the system 100 receives input 1002. The system 100 may process the input 1002 using N-part detection. The system 100 may apply topological simplification. Topological simplification may include a vacuum wrap algorithm. The output of the topological simplification is passed to phase 2 1020.

In phase 2 1020, the system 100 receives the output of phase 1 1010. The system 100 may apply a topological rig algorithm. The system 100 applies zone selection. Zone selection may include one or more approaches, such as per-element, parameter, element+diffusion & threshold, indication glyph, topological rig, and under-constrained zones. The output of the zone selection is passed to phase 3 1030.

In phase 3 1030, the system 100 receives the output of phase 2 1020. The system 100 applies extrinsic rigid zones positioning, extrinsic non-rigid zones positioning, intrinsic non-rigid zones integration, and intrinsic rigid zones processing. The output of phase 3 1030 may be an output 1004 displayed by the system 100 or sent to the digital fabrication unit 160 to be digitally fabricated.

In other embodiments, the output 1004 may be further processed in phase 4 1040, where post-processing functions may be performed.

In optional phase 4 1040, the system receives the output of phase 3 1030. The system 100 applies one or more post-processing functions, such as Boolean operation addition, NURBS deformation, and lattice generation. The output of phase 4 1040 may be an output displayed by the system 100.

In other embodiments, any of the phases 1010, 1020, and 1030 may be applied on the 3D target object in parallel with the 3D object. For instance, the algorithms of phase 1 1010 may be applied to a target to simplify its topology, and the algorithms of phase 2 1020 and phase 3 1030 may be applied to deform and modify the target before processing the 3D object deformation on the 3D target object.

Figure 11:
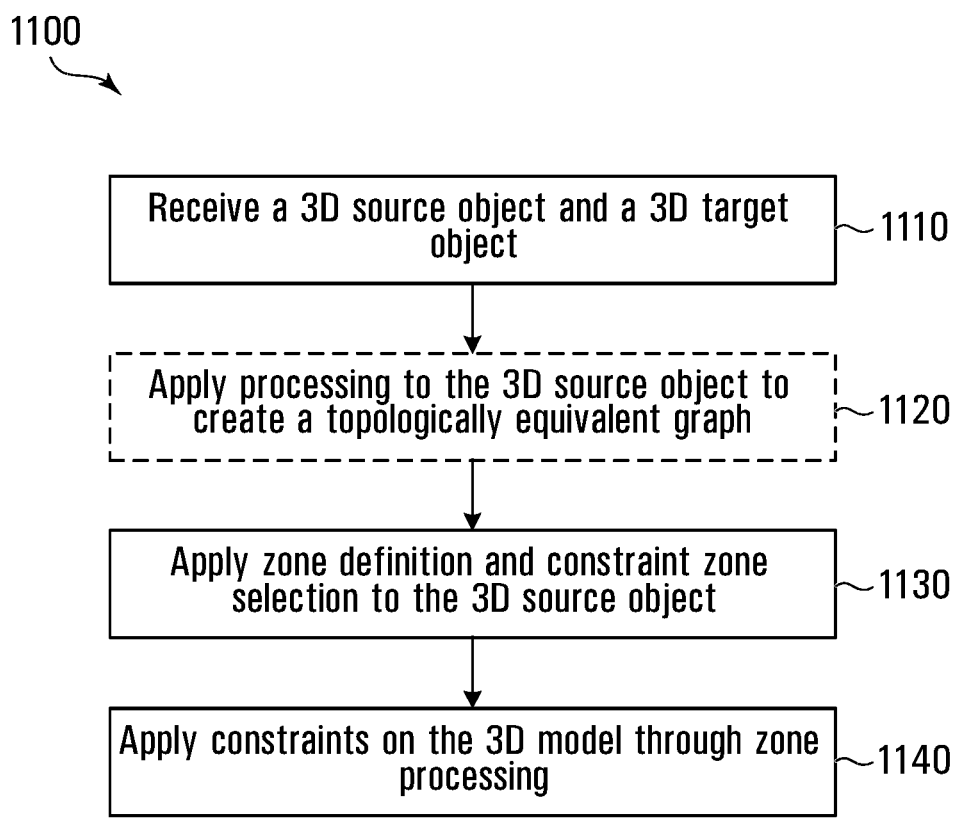
FIG. 11 shows a flowchart of an example embodiment of a method of deforming in a constrained manner a 3D object.

Referring to FIG. 11, shown therein is a flowchart of an example embodiment of a method 1100 of deforming in a constrained manner a 3D object.

At 1110, the system 100 receives a 3D object.

At 1120, the system 100 optionally applies processing to the 3D object to create a topologically equivalent graph (e.g., Reeb graph, centerlines for each segment—topology rig) to parametrize the zone definition.

At 1130, the system 100 applies zone definition and constraint zone selection to the 3D object, thereby generating a 3D model having a one or more of zones.

The constraint zone selection may comprise a selection of constraint zone types from a list consisting of extrinsic rigid (XR) zones, extrinsic non-rigid (XNR) zones, intrinsic rigid (IR) zones, and intrinsic non-rigid (INR) zones.

The constraint zone selection may be a parameterization method based on coordinate ranges of the 3D model.

At 1140, the system 100 applies constraints on the 3D model through zone processing applied to the plurality of zones, thereby generating the deformed 3D object. The zone processing may be carried out by processing at least one of the zones to guarantee fit of the 3D model onto the 3D target object (e.g., using surf-to-surf or XNR zone).

The 3D object may have closed volumes (either defined through a closed mesh surface, or a closed NURBS ensemble of surfaces) where a closed volume indicates where an algorithm can generate a lattice structure according to parameters including, but not limited to, density, orientation, and the lattice geometry itself.

The constraints may be based on the constraint zone selection.

The zone processing may include one or more of: (a) positioning XR zones to the plurality of zones; positioning XNR zones to the plurality of zones; positioning INR zones between XR zones and XNR zones; or applying IR zones (e.g., where deformation of the 3D model is to be avoided according to an intrinsic nature of the 3D object).

The zone processing may comprise positioning the XR zones using at least one of a rig file of the 3D target object or a rig file of the 3D object, a rig file being a markup language-defined file forming a coordinate system in a form of joints and elements.

The zone processing may comprise processing the XNR zones to guarantee fit of the 3D model onto the 3D object.

The zone processing may comprise processing the plurality of zones using a surface-to-surface (STS) algorithm that processes a surface of the 3D object containing a plurality of boundary curves onto a surface of the 3D object.

The zone processing may comprise processing the INR zones using a weight calculation to create a smooth transition between the XR zones and the XNR zones.

The zone processing may comprise one or more of the following steps: (a) positioning the IR zones onto the 3D model; (b) determining that one of the IR zones is positioned in one of the XNR zones or one of the INR zones; (c) applying a reverse transformation to the one of the IR zones to revert the one of the IR zones back to a shape consistent with the 3D object; and (d) re-deforming the INR zone using the one of the IR zones consistent with the 3D object as one of the IR zones.

The system 100 may output the deformed 3D object for use to cause the deformed 3D object to be digitally fabricated.

Figure 12:
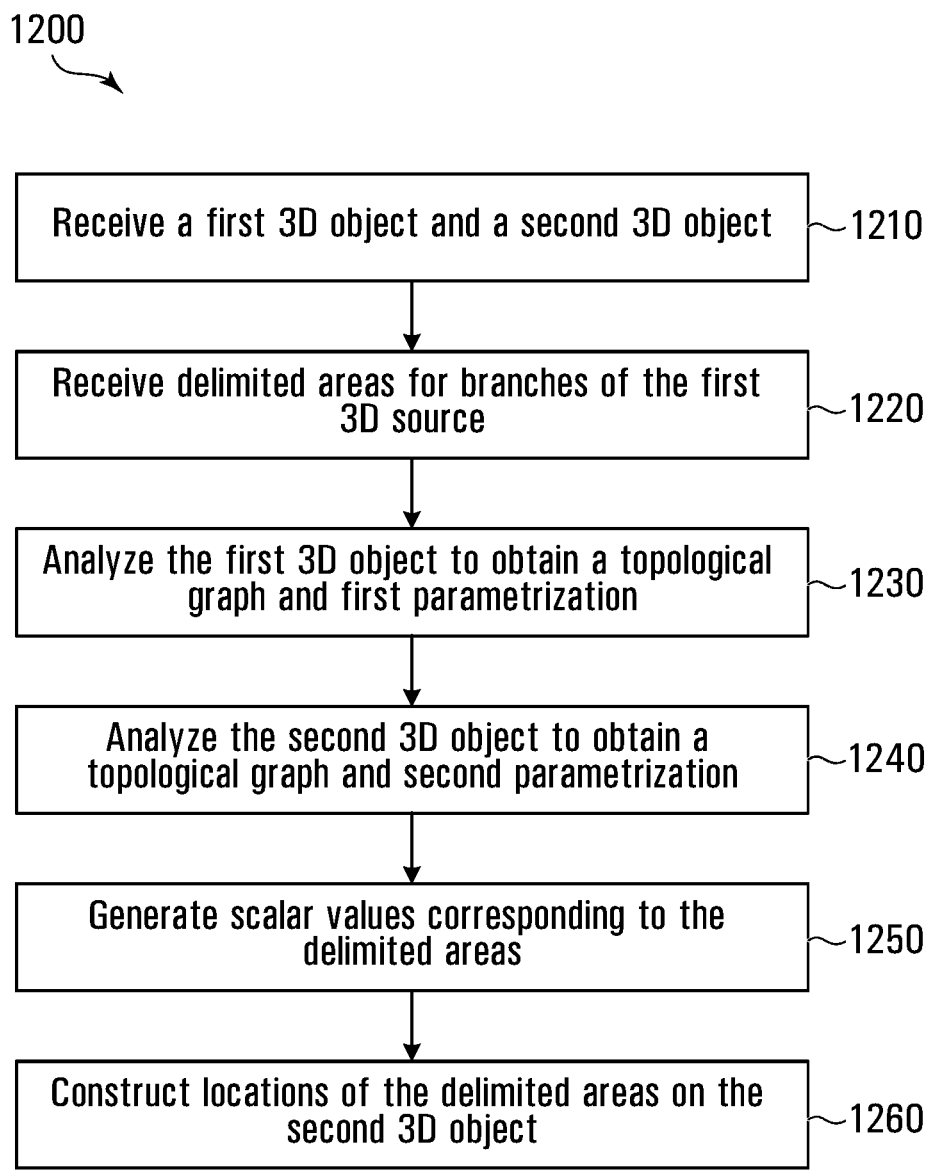
FIG. 12 shows a flowchart of an example embodiment of a method of using a topological graph of a first 3D object to transfer delimited areas to a second 3D object of similar topology.

Referring to FIG. 12, shown therein is a flowchart of an example embodiment of a method 1200 of using a topological graph of a first 3D object to transfer delimited areas to a second 3D object of similar topology. This may be referred to in short as using a topo rig to transfer parametrization.

At 1210, the system 100 receives a first 3D object and a second 3D object (e.g., a 3D target object).

At 1220, the system 100 receives one or more delimited areas for one or more branches of the first 3D object.

At 1230, the system 100 analyzes the first 3D object to obtain a topological graph (e.g., a Reeb graph) and uses this topological graph to create a first parametrization. The first parametrization includes a first set of scalar functions (where the set contains one or more scalar functions) for the first 3D object that correspond to the one or more branches of the first 3D object.

At 1240, the system 100 analyzes the second 3D object to obtain a topological graph (e.g., a Reeb graph) and uses this topological graph to create a second parametrization. The second parametrization includes a second set of scalar functions (where the set contains one or more scalar functions) for the second 3D object that correspond to the one or more branches of the second 3D object.

At 1250, the system 100 generates one or more scalar values corresponding to the delimited areas (e.g., equivalued cuts, slices, zones, constraints zone, delimitation of the zones, boundary curves) on the first 3D object using the first set of scalar functions.

At 1260, the system 100 transfers the delimited areas from the first 3D object onto the second 3D object using the first parametrization, the second parametrization, and the one or more scalar values.

At 1270, the system 100 constructs locations of the delimited areas on the second 3D object using the one or more scalar values and the second set of scalar functions.

The system 100 may output the second 3D object for use to cause the second 3D object to be digitally fabricated.

Figure 13:
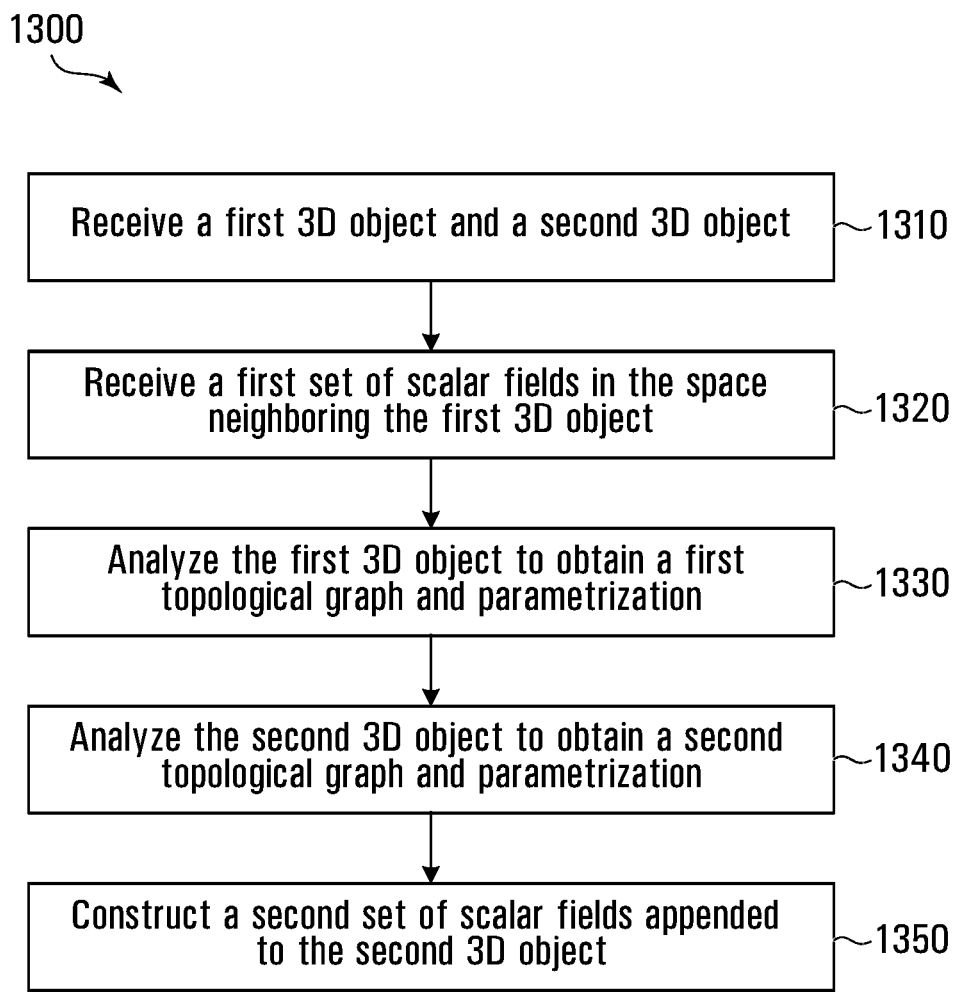
FIG. 13 shows a flowchart of an example embodiment of a method of using a topological graph of a first 3D object to transfer a first set of scalar fields to a second 3D object of similar topology.

Referring to FIG. 13, shown therein is a flowchart of an example embodiment of a method 1300 of using a topological graph of a first 3D object to transfer a first set of scalar fields to a second 3D object of similar topology.

At 1310, the system 100 receives a first 3D object and a second 3D object.

At 1320, the system 100 receives the first set of scalar fields in the space neighboring the first 3D object for one or more branches of the first 3D object.

At 1330, the system 100 analyzes the first 3D object to obtain a topological graph (e.g., a Reeb graph) and uses this topological graph to create a first parametrization. The first parametrization includes a first set of scalar functions for the first 3D object that correspond to the one or more branches of the first 3D object.

At 1340, the system 100 analyzes the second 3D object to obtain a topological graph (e.g., a Reeb graph) and uses this topological graph to create a second parametrization. The second parametrization includes a second set of scalar functions for the second 3D object that correspond to the one or more branches of the second 3D object.

At 1350, the system 100 constructs a second set of scalar fields appended to the second 3D object using the first parametrization, the second parametrization, and the first set of scalar fields.

The system 100 may output the second set of scalar fields for use to cause the second 3D object to be digitally fabricated.

Figure 14:
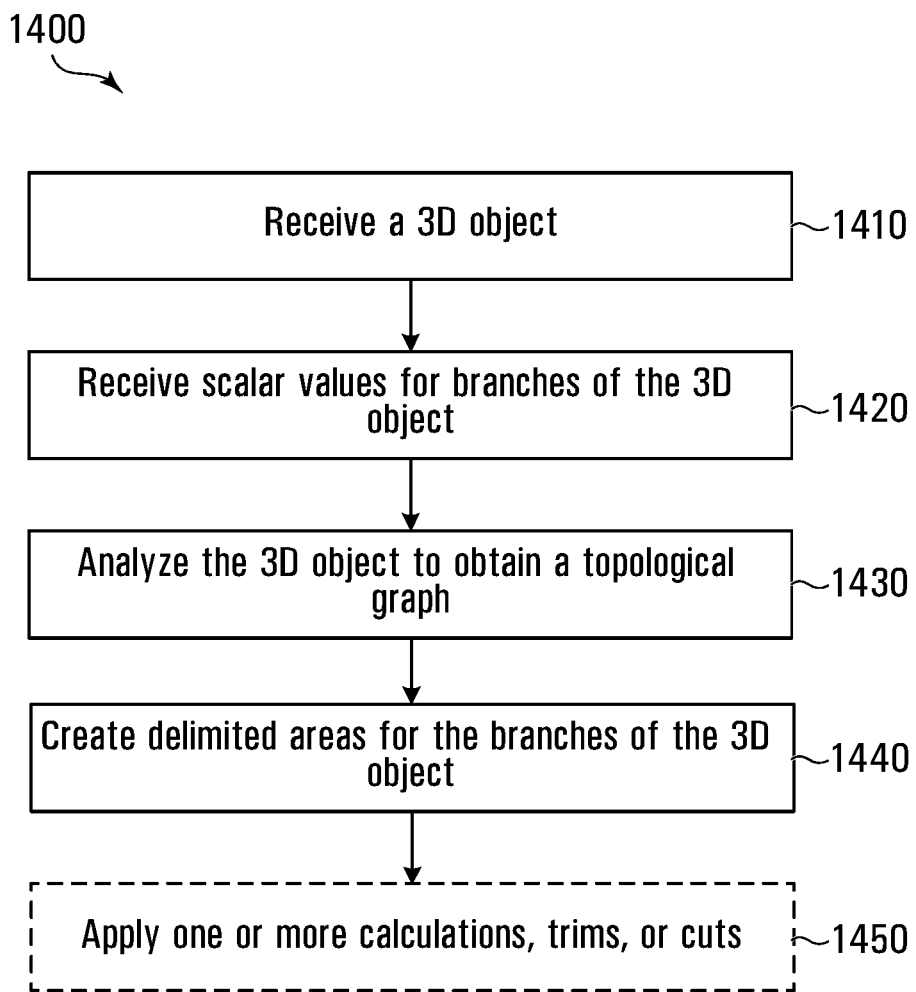
FIG. 14 shows a flowchart of an example embodiment of a method of creating one or more delimited areas onto a 3D object according to a topology of the 3D object.

Referring to FIG. 14, shown therein is a flowchart of an example embodiment of a method 1400 of creating one or more delimited areas onto a 3D object according to a topology (topological structure) of the 3D object. This may be referred to in short as using a topo rig.

At 1410, the system 100 receives a 3D object, the 3D object having one or more branches.

At 1420, the system 100 receives one or more scalar values for one or more branches of the 3D object for use in creating the delimited areas of the 3D object.

At 1430, the system 100 analyzes the 3D object to obtain a topological graph (e.g., using a Reeb graph). The topological graph has one or more segments corresponding to the branches. The system 100 uses the topological graph to create a parametrization, the parametrization including one or more scalar functions (e.g., poly-harmonic equations) for the 3D object corresponding to the branches.

To obtain the topological graph, the system 100 may calculate the scalar functions using one or more subsets of middle cuts of the 3D object as control points. The scalar functions provide a representation of a segment of the 3D object in the topological graph. The scalar functions may be real-valued, smooth functions. The calculation of the scalar functions may be compatible with Morse theory.

At 1440, the system 100 creates each of the delimited areas for each of the branches of the 3D object using the scalar values and the scalar functions.

At 1450, the system 100 optionally applies one or more calculations, trims, or cuts (or similar operations). These may include:

Using equivalued contours (or equivalued slices) on the scalar functions to calculate the centerlines of each segment (e.g., using the center of mass of the slice, or largest inscribed sphere) corresponding to the branches;

Using equivalued contours (or equivalued slices) on the scalar functions to calculate the centerlines of each segment (e.g., using the center of mass of the slice, or largest inscribed sphere) corresponding to the branches, as well as the values of the slices being passed to the centerlines;

Creating a mapping between a graph of the centerlines and the scalar functions to calculate a value of one of the equivalued contours being passed to the one centerlines;

Trimming the centerline based on proximity (or presence or crossing) of another centerline;

Trimming the centerline based on proximity (or presence or crossing) of another centerline and merging them to obtain a graph of the centerline that has the same topology as the 3D object (e.g., that approximates the center of each branches better than the Reeb graph segments);

Using each centerline (or a first and a second centerline), or a graph made of the centerlines, to create the one or more scalar functions corresponding to the branches, creating parametrically the delimited areas of the 3D object using the scalar values and the scalar functions (e.g., to control parametrically the location of cuts);

Transferring parametric cuts between two models of the 3D object;

Using cuts to define zones on a model of the 3D object to be further processed by other methods.

The system 100 may output the delimited areas of the 3D object for use to cause the 3D object to be digitally fabricated.

Figure 15:
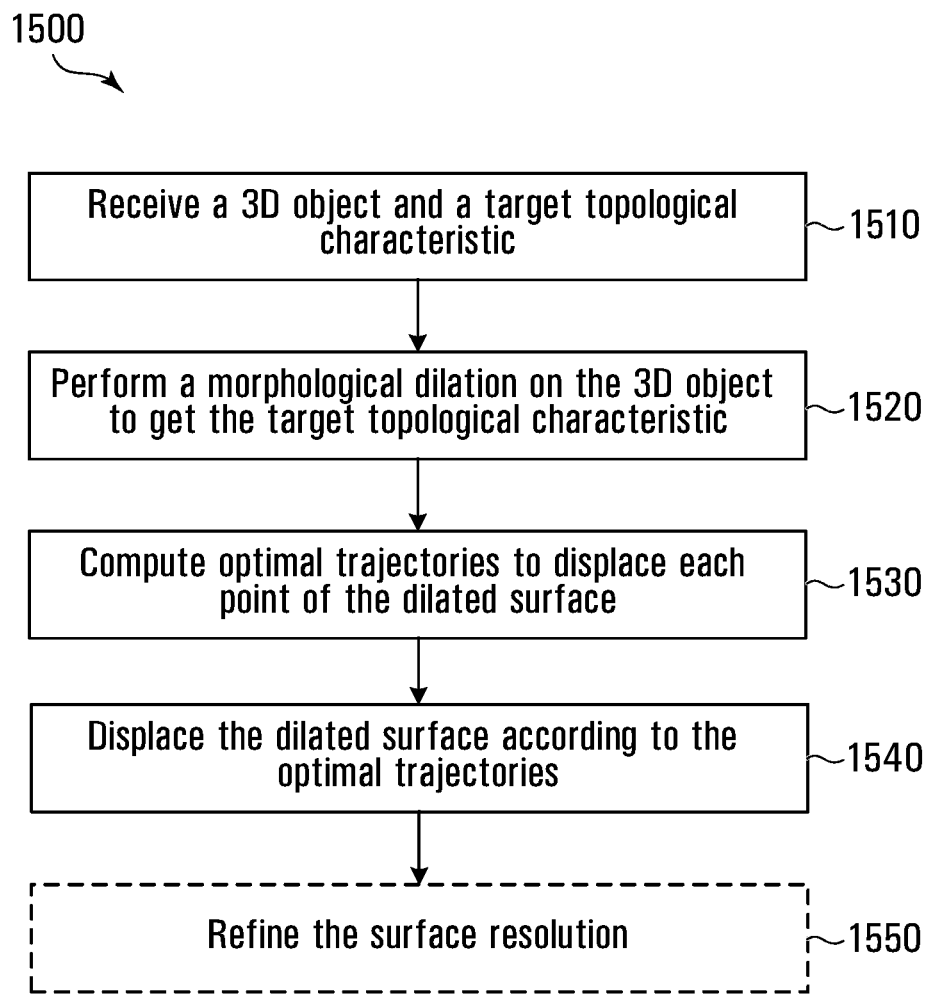
FIG. 15 shows a flowchart of an example embodiment of a method of simplifying the topology of a 3D object while preserving similar geometry.

Referring to FIG. 15, shown therein is a flowchart of an example embodiment of a method 1500 of simplifying the topology (e.g., removing a genus) of a 3D object while preserving similar geometry. This may be referred to in short as using a toposimp and vacuum wrap.

At 1510, the system 100 receives a 3D object and a target topological characteristic (e.g., genus, number of branches, graph).

At 1520, the system 100 performs a morphological dilation operation on the 3D object until the target topological characteristic is obtained. The output is a dilated surface of the appropriate topology.

At 1530, the system 100 computes optimal trajectories (or streamlines) to displace each point of the dilated surface in the direction of the 3D object using a field computed from a property (e.g., geometry, topology) of the 3D object. Here, the system 100 may use a guiding scalar field, which is constructed by: (a) using a scalar function (e.g., surface guiding scalar) over the 3D object and extrapolating that scalar function onto the space neighboring 3D object (e.g., extrapolated guiding scalar field); (b) generating a signed distance field emanating from the 3D object onto the space neighboring the 3D object; and (c) performing a calculation using the signed distance field and the extrapolated guiding scalar field to create the guiding scalar field.

At 1540, the system 100 displaces the dilated surface according to the optimal trajectories with or without intermediary steps until a stopping criterion is reached for each individual point of the dilated surface. The method 100 may iterate through 1520, 1530, and 1540 until the stopping criterion is reached for all the individual points of the surface. The system 100 generates a topologically simplified 3D object.

At 1550, the system 100 optionally refines the surface resolution, using intermediary steps, when a certain stop criterion is reach.

The system 100 may output the topologically simplified 3D object for use to cause the topologically simplified 3D object to be digitally fabricated.

Figure 16:
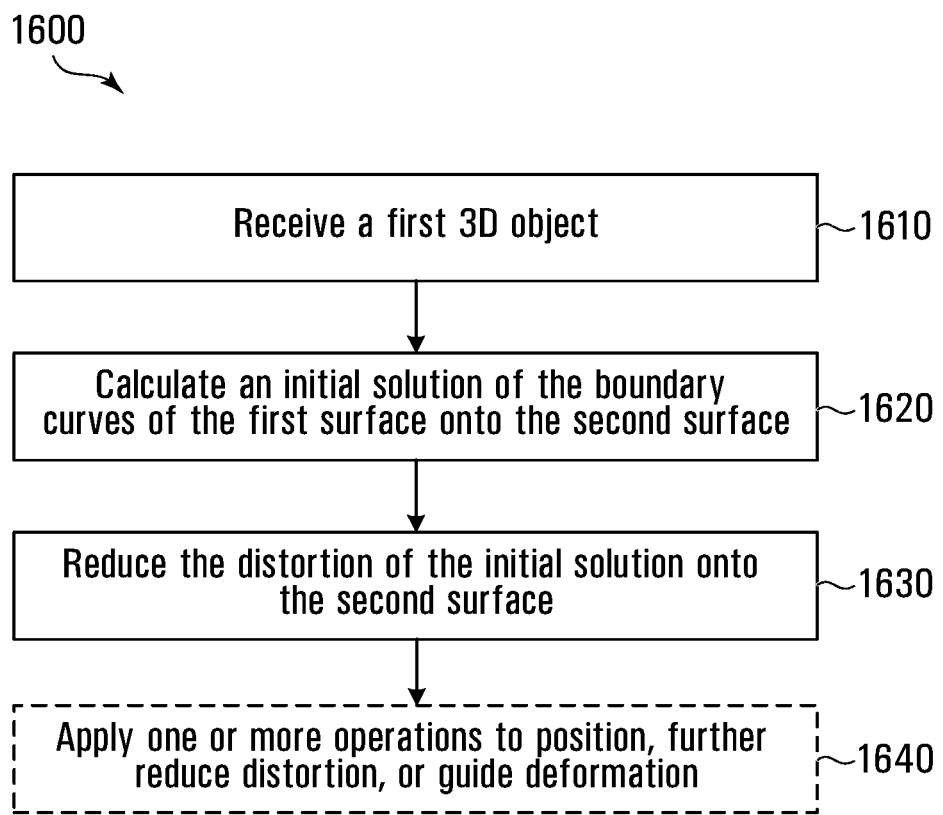
FIG. 16 shows a flowchart of an example embodiment of a method of processing the boundary curves of a surface of a first 3D object onto a surface of a second 3D object in a constrained manner.

Referring to FIG. 16, shown therein is a flowchart of an example embodiment of a method 1600 of processing the boundary curves of a surface of a first 3D object (the first surface) onto the surface of a second 3D object (the second surface) in a constrained manner.

At 1610, the system 100 receives the first surface having a one or more boundary curves.

At 1620, the system 100 calculates an initial solution of the first surface projected onto the second surface. This calculation may involve an algorithm that is robust regarding the topology of the first surface and second surface. This calculation may include one or more of:

Applying constraint points onto the second surface, calculating a plurality of curves onto the second surface using the constraint points on the second surface, and merging the curves to create the boundary curves serving as the initial solution;

Using an iterative closest point (ICP) algorithm that uses a radial basis function deformation to transform the boundaries of the first surface onto the second surface;

Applying constraint points onto the second surface that have equivalents on the first surface, together having a matching set of constraint points, using a radial basis function deformation of the first surface guided by the matching set of constraint points (and possibly doing a projection onto the second surface);

Using a point on the second surface that serves to compute a contour that is equidistant from the point;

Calculating an intersection between rays coming from the boundary curves of the first surface onto the second surface in a direction of a vector;

Moving points of the boundary curves of the first surface to associated closest points thereof on the second surface;

The system 100 may apply constraint points onto the second surface that have equivalents on the first surface. The system 100 may use those constraint points on the second surface to create geodesic lines (e.g., where the geodesic line is in the same topology as the source surface). The initial solution may be derived from: (a) the constraint points; (b) an ICP and thin plate spline transform; (c) a thin plate spline transform guided by a matching set of constraint points and doing a projection; or (d) a point on the second surface that serves to compute a contour that is equidistant from the point (e.g., Euler or geodesic distance).

At 1630, the system 100 reduces the distortion of the boundary curves of the initial or optimized solution onto the second surface, using an energy calculation and an optimization on the displacement of points of the initial or optimized solution of the boundary curves of the first surface projected on the second surface (e.g., at a particular iteration) in comparison with boundary curves of the source surface. The system 100 may use the constraint points as an additional energy in the optimization.

The system 100 may use the optimized boundary curves (the optimized solution) of the source surface on the target surface to guide the positioning of the rest of the source surface (e.g., the entire area).

At 1640, the system 100 optionally applies one or more operations to position, further reduce distortion, guide deformation, or the like. These operations may include:

Applying constraint points onto the second surface that have equivalents on the first surface, using the constraint points on the second surface to act as constraints and guide the positioning of the first surface boundary curves onto the second surface, where the constraint points allow calculating additional energy terms to control positioning of the optimized or initial solution onto the second surface;

Using the optimized solution to control the positioning of the first surface onto the second surface;

Using the optimized solution to control the positioning of the first surface onto the second surface, as well as optimizing the first surface onto the second surface to reduce the distortion in comparison to the first surface (e.g., using ARAP or AMAP);

Using the first surface and the first surface projected onto the target surface to guide the deformation of the 3D source object;

Using the first surface and the first surface projected onto the target surface to guide the deformation of the 3D source object using at least one of MVC, poly-harmonic, radial basis function deformation, TPS, quadray coordinates, or any other way as to overlay the 3D information onto the target surface.

The system 100 may use the one or more operations in order to obtain a solution that is independent of the topology of the target surface when, for example, the initial solution is independent of the presence of a hole in the target surface.

During execution of method 1600, the cage built upon the first surface and first surface projected onto the target may be composed of multiple layers of a cage with locally varying thickness. The cage or layering of cages may be built using the normal of the first surface or any combination of the first surface and a vector. The first surface onto the target surface may be locally or globally offset to create controls gaps or interference with the target surface.

The system 100 may output the first surface projected onto the target surface for use to cause the first surface projected onto the target surface to be digitally fabricated.

Figure 17:
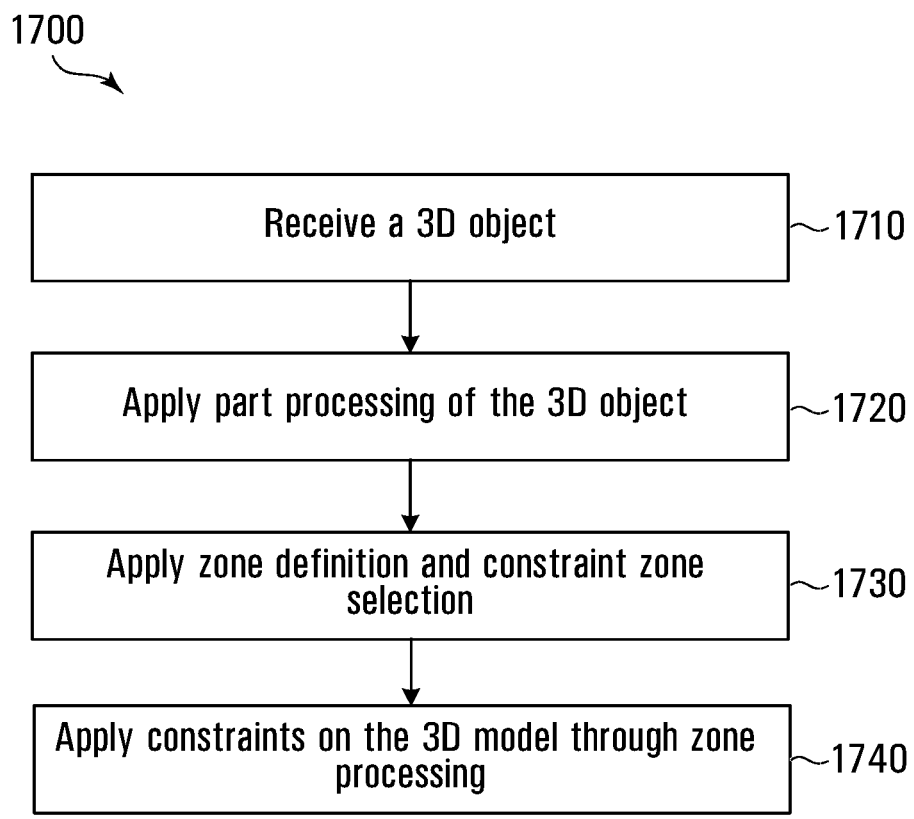
FIG. 17 shows a flowchart of an example embodiment of a method of deforming a 3D object into a deformed 3D object in a constrained manner.

Referring to FIG. 17, shown therein is a flowchart of an example embodiment of a method 1700 of deforming a 3D object into a deformed 3D object in a constrained manner.

At 1710, the system 100 receives the 3D object and the 3D target object.

At 1720, the system 100 applies part processing of the 3D object through, for example, a topological rig. As a result, the system 100 generates a plurality of branches into which the 3D object is separated.

The part processing of the 3D object further may comprise dividing the plurality of branches into a plurality of zones.

The topological simplification may comprise iterated steps to obtain a desired number of the plurality of branches. The iterated steps may comprise: (a) performing a dilation operation on an implicit representation of the 3D object; (b) converting the implicit representation back into a dilated surface; and (c) calculating a Reeb graph based on the dilated surface.

The part processing may further comprise applying a vacuum wrap algorithm to the dilated surface, thereby generating a vacuum wrap surface having a simplified topology and a geometry substantially similar to the 3D object.

At 1730, the system 100 applies zone definition and constraint zone selection to the plurality of branches. As a result, the system 100 generates a 3D model having a plurality of zones.

The constraint zone selection may comprise a selection of constraint zone types from a list consisting of extrinsic rigid (XR) zones, extrinsic non-rigid (XNR) zones, intrinsic rigid (IR) zones, and intrinsic non-rigid (INR) zones.

The zone definition and constraint zone selection may further comprise performing a topology rig algorithm on the vacuum wrap surface (or the 3D object if it already has the desired topology) that divides each of the plurality of branches into the plurality of zones. The topology rig algorithm may comprise: (a) calculating middle points of a Reeb graph that is based on the vacuum wrap surface; (b) calculating middle cuts from the middle points; and (c) calculating a plurality of functions corresponding to the plurality of zones. The topology rig algorithm may determine a centerline for each of the plurality of zones.

The constraint zone selection may be a per-element method allowing for the application of constraint zone types to identified zones of the 3D object based on a plurality of types of structures (e.g., comprising points, edges, and patches).

The constraint zone selection may be a parameterization method based on coordinate ranges of the 3D object.

At 1740, the system 100 applying constraints on the 3D model through zone processing applied to the plurality of zones. As a result, the system 100 generates the deformed 3D object.

The constraints may be based on the constraint zone selection.

The zone processing may include one or more of: positioning XR zones to the plurality of zones (e.g., to guarantee integrality and function for the deformed 3D object); positioning XNR zones to the plurality of zones (e.g., to provide a custom fit for the deformed 3D object onto the 3D target object); positioning INR zones between XR zones and XNR zones (e.g., to provide a smooth transition between the XR zones and the XNR zones); and applying IR zones where deformation of the 3D object is to be avoided according to an intrinsic nature of the 3D object (e.g., to ensure non-deformation around assembly points).

The zone processing may comprise positioning the XR zones using a rig file of the 3D object and/or a rig file of the 3D target object, the rig file being a markup language-defined file forming a coordinate system in a form of joints and elements.

The zone processing may comprise processing the XNR zones to guarantee fit of the 3D model onto the 3D target object, thus guaranteeing the deformed 3D object will fit the 3D target object.

The zone processing may comprise processing the plurality of zones using a surface-to-surface (STS) algorithm that processes a surface of the 3D object containing a plurality of boundary curves onto a surface of the 3D target object.

The zone processing may comprise processing the INR zones using a weight calculation to create a smooth transition between the XR zones and the XNR zones.

The zone processing may comprise one or more of the following operations: positioning the IR zones of the 3D model; determining that one of the IR zones is positioned in one of the XNR zones or one of the INR zones; applying a reverse transformation to the one of the IR zones to revert the one of the IR zones back to a shape consistent with the 3D object; and re-deforming the one of the INR zones with the IR as one of the XR zones.

The system 100 may output the deformed 3D object for use to cause the deformed 3D object to be digitally fabricated.

In at least one embodiment, one or more of the methods 1100, 1200, 1300, 1400, 1500, 1600, and/or 1700 (e.g., topo rig, topo simp, toposimp+vacuum wrap) are used in an environment in which a medical specialist accesses the case of a patient in terms of vascular health or lung and airways health or nervous systems health. Vessels, lungs, airways, and nervous systems all involves complex networks of tubular features in which one of more of these methods might be used to process a 3D object for the purpose of accessing the health of a patient or planning a treatment.

In at least one embodiment, one or more of the methods 1100, 1200, 1300, 1400, 1500, 1600, and/or 1700 (e.g., topo rig, topo simp, toposimp+vacuum wrap, surface to surface, constraint deformation) are used in an environment in which a video game specialist performs a series of processing onto a 3D object for the purpose of creating a video game.

In at least one embodiment, one or more of the methods 1100, 1200, 1300, 1400, 1500, 1600, and/or 1700 (e.g., topo rig, topo simp, toposimp+vacuum wrap, surface to surface, constraint deformation) are used in an environment in which a video game specialist performs a series of processing onto a 3D object for the purpose of creating an animation or animated movie.

In at least one embodiment, one or more of the methods 1100, 1200, 1300, 1400, 1500, 1600, and/or 1700 (e.g., topo rig, topo simp, toposimp+vacuum wrap) are used in an environment in which an FEA simulation specialist performs a series of processing onto a 3D object for the purpose of creating an 3D volumetric mesh of a 3D object and performing FEA analysis onto the 3D object.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. A method of deforming a 3D object onto a 3D target object in a constrained manner comprising:
   receiving the 3D object and the 3D target object;
   applying zone definition and constraint zone selection to the 3D object, the constraint zone selection comprising a selection of constraint zone types that include one or more rigid zones and one or more non-rigid zones from a list consisting of extrinsic rigid (XR) zones, extrinsic non-rigid (XNR) zones, intrinsic rigid (IR) zones, and intrinsic non-rigid (INR) zones, thereby generating a 3D model having a plurality of zones;
   applying constraints on the 3D model through zone processing applied to the plurality of zones, where at least a subset of a surface of at least one of the plurality of zones is projected onto a subset of a surface of the 3D target object, and where at least one of the plurality of zones undergoes at least one non-rigid deformation, thereby generating a deformed 3D object where the 3D model conforms to a portion of the 3D target object; and
   outputting the deformed 3D object to cause the deformed 3D object to be digitally fabricated.

2. The method of claim 1, further comprising:
   applying processing to the 3D object to create a topologically equivalent graph to parametrize the zone definition of the 3D model.

3. The method of claim 1, wherein the 3D object comprises one or more closed volumes and wherein the applying constraints on the 3D model generates the deformed 3D object with one or more closed volumes that indicate a location where a lattice structure can be generated.

4. The method of claim 1, wherein the constraints are based on the constraint zone selection.

5. The method of claim 1, wherein the zone processing includes positioning the XR zones to the plurality of zones.

6. The method of claim 1, wherein the zone processing includes positioning the XNR zones to the plurality of zones.

7. The method of claim 1, wherein the zone processing includes positioning the INR zones between the XR zones and the XNR zones.

8. The method of claim 1, wherein the zone processing includes applying the IR zones where deformation of the 3D model is to be avoided according to an intrinsic nature of the 3D object.

9. The method of claim 1, wherein the constraint zone selection is a per-element method allowing for the application of constraint zone types to zones of the 3D model based on a plurality of types of structures.

10. The method of claim 1, wherein the constraint zone selection is a parameterization method based on coordinate ranges of the 3D model.

11. The method of claim 1, wherein the zone processing comprises positioning the XR zones using at least one of a rig file of the 3D target object or a rig file of the 3D object, a rig file being a markup language-defined file forming a coordinate system in a form of joints and elements.

12. The method of claim 1, wherein the zone processing comprises processing the XNR zones to guarantee fit of the 3D model onto the 3D object.

13. The method of claim 1, wherein the zone processing comprises processing the plurality of zones using a surface-to-surface (STS) algorithm that processes a surface of the 3D object containing a plurality of boundary curves onto a surface of the 3D object.

14. The method of claim 1, wherein the zone processing comprises processing the INR zones using a weight calculation to create a smooth transition between the XR zones and the XNR zones.

15. The method of claim 1, wherein the zone processing comprises:
positioning the IR zones onto the 3D model;
determining that one of the IR zones is positioned in one of the XNR zones or one of the INR zones;
applying a reverse transformation to the one of the IR zones to revert the one of the IR zones back to a shape consistent with the 3D object; and
re-deforming the INR zone using the one of the IR zones consistent with the 3D object as one of the IR zones.

16. A method of deforming a 3D object into a deformed 3D object in a constrained manner to permit the deformed 3D object to conform to a 3D target object comprising:
receiving the 3D object and the 3D target object;
applying part processing of the 3D object through a topological rig, thereby generating a plurality of branches into which the 3D object is separated;
applying zone definition and constraint zone selection to the plurality of branches, the constraint zone selection comprising a selection of constraint zone types that include one or more rigid zones and one or more non-rigid zones from a list consisting of extrinsic rigid (XR) zones, extrinsic non-rigid (XNR) zones, intrinsic rigid (IR) zones, and intrinsic non-rigid (INR) zones, thereby generating a 3D model having a plurality of zones;
applying constraints on the 3D model through zone processing applied to the plurality of zones, thereby generating a deformed 3D object conforming to at least a portion of the 3D target object; and
outputting the deformed 3D object for use to cause the deformed 3D object to be digitally fabricated.

17. The method of claim 16, wherein the constraints are based on the constraint zone selection.

18. The method of claim 16, wherein the part processing of the 3D model further comprises dividing the plurality of branches into a plurality of zones.

19. The method of claim 16, wherein the zone processing includes positioning the XR zones to the plurality of zones.

20. The method of claim 16, wherein the zone processing includes positioning the XNR zones to the plurality of zones.

21. The method of claim 16, wherein the zone processing includes positioning the INR zones between the XR zones and the XNR zones.

22. The method of claim 16, wherein the zone processing includes applying the IR zones where deformation of the 3D model is to be avoided according to an intrinsic nature of the 3D object.

23. The method of claim 16, wherein the constraint zone selection is a per-element method allowing for the application of constraint zone types to zones of the 3D model based on a plurality of types of structures.

24. The method of claim 16, wherein the constraint zone selection is a parameterization method based on coordinate ranges of the 3D model.

25. The method of claim 16, wherein the zone processing comprises positioning the XR zones using at least one of a rig file of the 3D target object or a rig file of the 3D object, a rig file being a markup language-defined file forming a coordinate system in a form of joints and elements.

26. The method of claim 16, wherein the zone processing comprises processing the XNR zones to guarantee fit of the 3D model onto the 3D object.

27. The method of claim 16, wherein the zone processing comprises processing the plurality of zones using a surface-to-surface (STS) algorithm that processes a surface of the 3D object containing a plurality of boundary curves onto a surface of the 3D object.

28. The method of claim 16, wherein the zone processing comprises processing the INR zones using a weight calculation to create a smooth transition between the XR zones and the XNR zones.

29. The method of claim 16, wherein the zone processing comprises:
positioning the IR zones onto the 3D model:
determining that one of the IR zones is positioned in one of the XNR zones or one of the INR zones;
applying a reverse transformation to the one of the IR zones to revert the one of the IR zones back to a shape consistent with the 3D object; and
re-deforming the INR zone using the one of the IR zones consistent with the 3D object as one of the IR zones.

* * * * *